(12) United States Patent
Hoshi et al.

(10) Patent No.: US 9,893,333 B2
(45) Date of Patent: Feb. 13, 2018

(54) BATTERY BLOCK AND SECONDARY BATTERY MODULE

(71) Applicants: Hitachi Vehicle Energy, Ltd., Hitachinaka-shi, Ibaraki (JP); NISSAN MOTOR CO., LTD., Yokohama-shi, Kanagawa (JP)

(72) Inventors: Hiroshi Hoshi, Hitachi (JP); Tsunemi Aiba, Kiryu (JP); Naoki Kojima, Hitachinaka (JP); Chikara Kikkawa, Hitachi (JP); Toshiyuki Yoshida, Mito (JP); Shigeyuki Kiyota, Yokohama (JP); Yoshiyuki Tanaka, Yokohama (JP); Toyoki Iguchi, Yokohama (JP); Hiroaki Saitou, Yokohama (JP)

(73) Assignees: HITACHI AUTOMOTIVE SYSTEMS, LTD., Ibaraki (JP); NISSAN MOTOR CO., LTD., Kanagawa (JP)

( * ) Notice: Subject to any disclaimer, the term of this patent is extended or adjusted under 35 U.S.C. 154(b) by 794 days.

(21) Appl. No.: 13/859,795

(22) Filed: Apr. 10, 2013

(65) Prior Publication Data

US 2013/0273398 A1 Oct. 17, 2013

(30) Foreign Application Priority Data

Apr. 13, 2012 (JP) .................................. 2012-092322

(51) Int. Cl.
*H01M 2/02* (2006.01)
*H01M 2/10* (2006.01)
*H01M 6/50* (2006.01)

(52) U.S. Cl.
CPC ....... *H01M 2/1077* (2013.01); *H01M 6/5027* (2013.01); *H01M 2/022* (2013.01)

(58) Field of Classification Search
CPC ... H01M 2/1077; H01M 2/022; H01M 6/5027
See application file for complete search history.

(56) References Cited

U.S. PATENT DOCUMENTS 6,410,184 B1 6/2002 Horiuchi et al.
2001/0046624 A1 11/2001 Goto et al.
(Continued)

FOREIGN PATENT DOCUMENTS

CN 1881656 A 12/2006
CN 101346832 A 1/2009
(Continued)

OTHER PUBLICATIONS

Japanese Office Action dated Nov. 1, 2016. Japanese Application No. 2013-079822.

*Primary Examiner* — Ula C Ruddock
*Assistant Examiner* — Frank Chernow
(74) *Attorney, Agent, or Firm* — Volpe and Koenig, P.C.

(57) ABSTRACT

Provided are a battery block and a secondary battery module capable of holding a plurality of battery cells stably and so reducing a load applied to a welding part of a conductive member that is connected to an electrode by welding or the like. The battery block includes a lower holding frame and a middle holding frame, one of which includes two protrusions that are in contact with an outer peripheral face of each battery cell and the other includes a pressing part that presses the outer peripheral face of the battery cell inwardly in the radial direction. Then, one of an upper holding frame and the middle holding frame includes two protrusions that are in contact with an outer peripheral face of each battery cell and the other includes a pressing part that presses the outer peripheral face of the battery cell inwardly in the radial direction.

15 Claims, 18 Drawing Sheets

(56) References Cited

U.S. PATENT DOCUMENTS

| | | |
|---|---|---|
| 2006/0286441 A1 | 12/2006 | Matsuoka et al. |
| 2007/0264562 A1 | 11/2007 | Kang et al. |
| 2008/0057393 A1* | 3/2008 | Onuki et al. ............... 429/159 |
| 2009/0104516 A1 | 4/2009 | Yoshihara et al. |
| 2011/0052957 A1* | 3/2011 | Ohta ............... H01M 2/1083 |
| | | 429/99 |

FOREIGN PATENT DOCUMENTS

| | | |
|---|---|---|
| EP | 1 156 537 A2 | 11/2001 |
| JP | 60-194865 U | 12/1985 |
| JP | 10-029172 A | 2/1998 |
| JP | 2000-223096 A | 8/2000 |
| JP | 2001-006643 A | 1/2001 |
| JP | 2001-325996 A | 11/2001 |
| JP | 2007-005288 A | 1/2007 |
| JP | 2007-073205 A | 3/2007 |
| JP | 2007-234369 A | 9/2007 |
| JP | 2008-066061 A | 3/2008 |
| JP | 2008-311130 A | 12/2008 |

* cited by examiner

BATTERY BLOCK AND SECONDARY BATTERY MODULE

BACKGROUND OF THE INVENTION

Field of the Invention

The present invention relates to a battery block holding a plurality of battery cells and a secondary battery module.

Background Art

JP 2001-6643 A, for example, shows a power supply device including a holder case 2 containing a plurality of power supply modules (battery cells) 1 connected in series. The holder case 2 includes upper and lower cover case 2A and an intermediate case 2B disposed between the upper and lower cover case 2A, and is configured so that the power supply modules 1 are sandwiched and fixed between the cover case 2A and the intermediate case 2B to be included internally at a fixed position. Then these plurality of power supply modules have output terminals connected in series.

Since the power supply device described in the above patent document is configured to include a large number of power supply modules (corresponding to battery cells) 1 internally at a fixed position while sandwiching them between the cover case 2A and the intermediate case 2B for fixing, the fixing state of the power supply modules is not stable and each power supply module may move slightly due to vibrations or the like. The power supply modules may have different dimensions such as a diameter, following their tolerance during manufacturing, and so a space may be generated between the power supply modules and the cover case or the intermediate case during sandwiching for fixing, which may be another factor to move the power supply modules slightly due to vibrations or the like. Then, a load may be applied to a welding part of a conductive member connecting the output terminals due to vibrations or the like.

In the thus configured battery block, when the plurality of power supply modules, e.g., cylindrical battery cells, aligned and fixed are sandwiched between two members, a space between the battery cells and the two members may vary with each battery cell having a different diameter, and then the battery cells may move slightly between the two members due to the space. The plurality of battery cells are connected at their electrodes with conductive plates or the like, and in the case of fixing the conductive plates by welding, a load will be applied to the welding part, which may cause a defect for connection. When the connected part is disconnected, the storage device loses its function unfortunately.

SUMMARY OF THE INVENTION

In view of these problems, it is an object of the present invention to provide a battery block capable of holding a plurality of battery cells stably, and a secondary battery module accommodating such a battery block.

In order to achieve the above object, a battery block according to the present invention includes: a cylindrical plurality of battery cells arranged; and two holding members sandwiching the arrangement of the battery cells from a radial direction of the battery cells for holding, the two holding members facing each other. One of the two holding members includes two protrusions in contact with an outer peripheral face of each battery cell, and the other holding member includes a pressing part that presses the outer peripheral face of the battery cell inwardly in the radial direction.

Effects of the Invention

The battery block of the present invention can hold a plurality of battery cells stably, and so can suppress slight displacement of the battery cells due to vibrations or the like applied thereto. Thus, conductive members connecting battery cells can be connected stably.

DESCRIPTION OF A PREFERRED EMBODIMENT OF THE INVENTION

The following describes one embodiment of a secondary battery module including a battery block according to the present invention in detail, with reference to the drawings.

The present embodiment describes a lithium-ion battery device as one example of a secondary battery module. The lithium-ion battery device according to the present embodiment is applied to a vehicle-mounted power supply device in an electric motor driving system of an electric vehicle like an electric automobile. The concept of this electric automobile includes, for example: a hybrid electric automobile equipped with an engine as an internal-combustion engine and an electric motor as a driving source of the vehicle; and a pure electric vehicle including only an electric motor as a driving source of the vehicle.

Figure 1A:
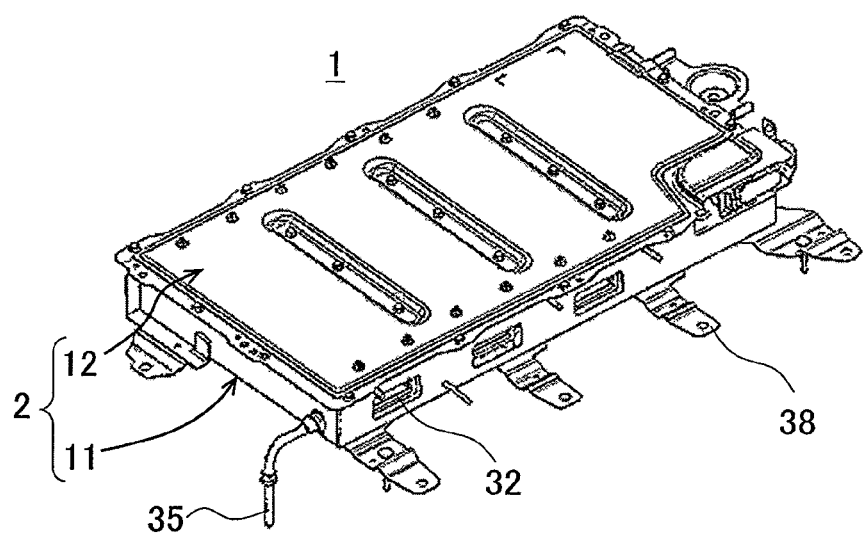
FIG. 1A shows the exterior configuration of a secondary battery module as one embodiment including a battery block according to the present invention, which is a perspective view from the front left side.
Figure 1B:
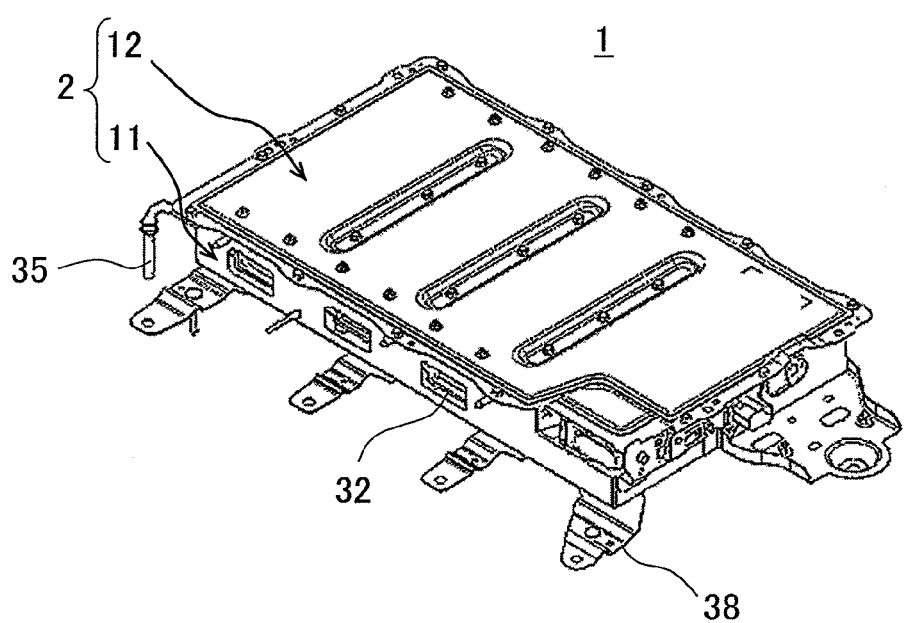
FIG. 1B shows the exterior configuration of a secondary battery module as one embodiment including a battery block according to the present invention, which is a perspective view from the front right side.
Figure 2:
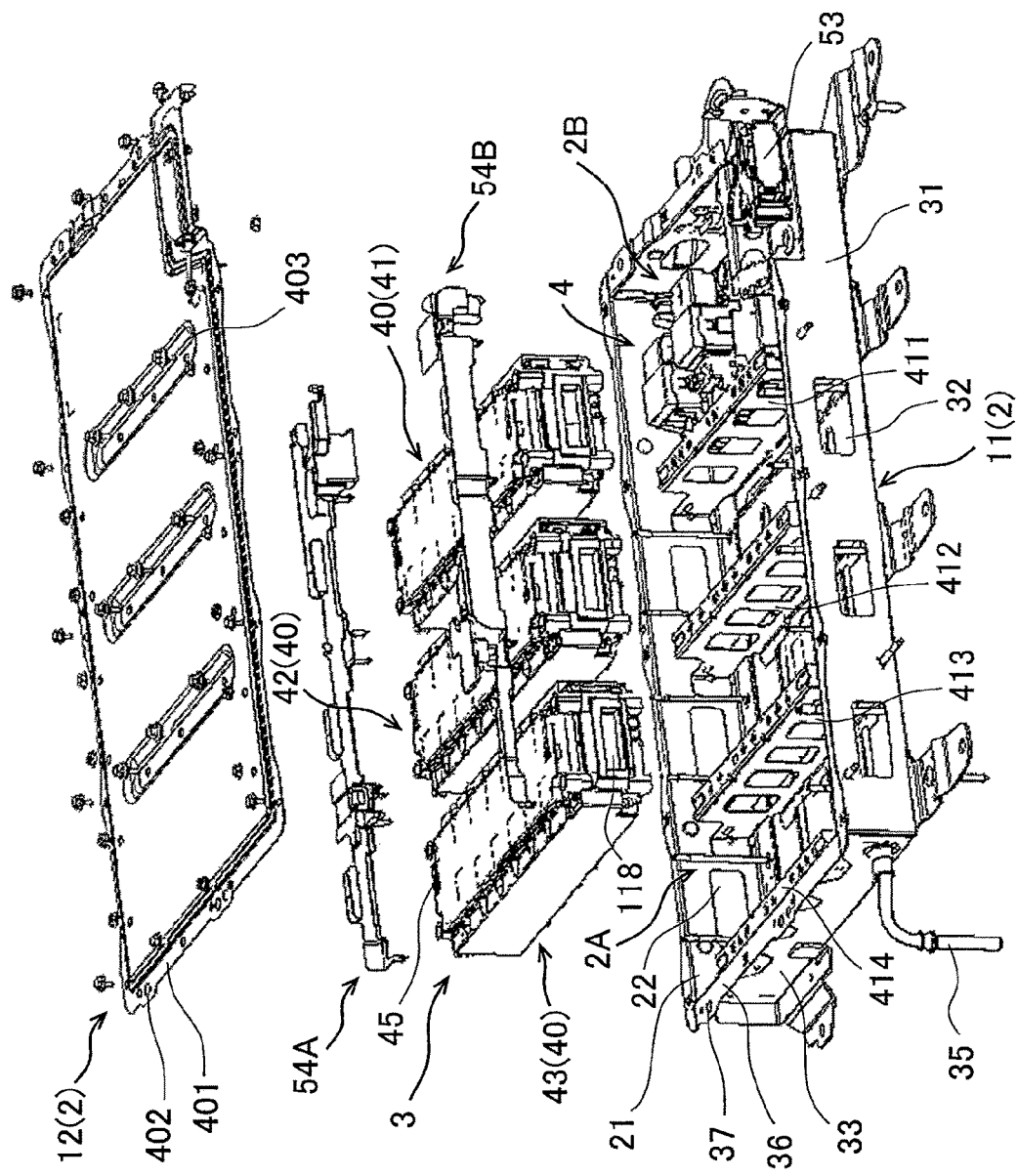
FIG. 2 is an exploded perspective view of the secondary battery module of FIG. 1.
Figure 3:
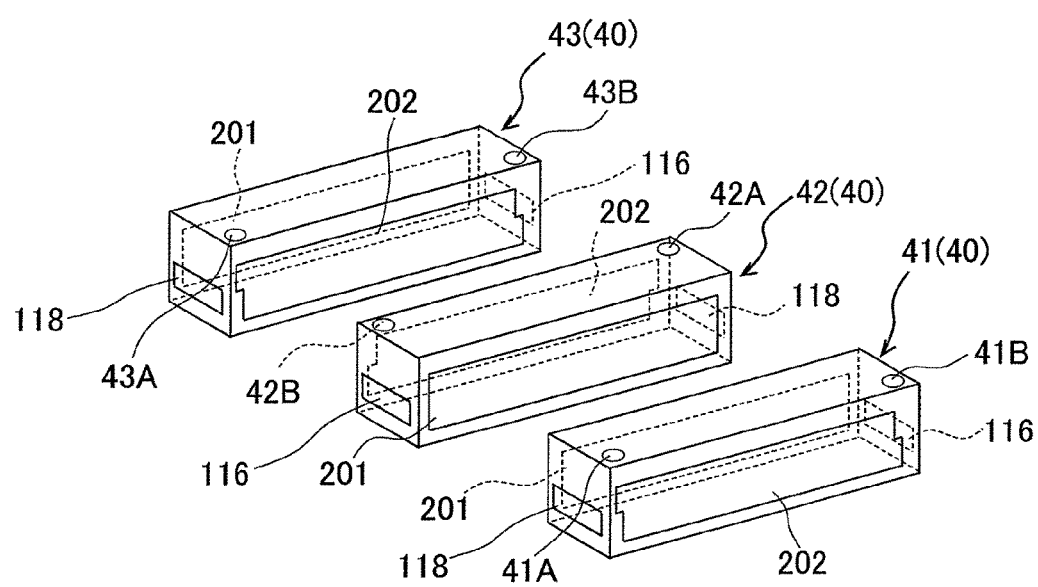
FIG. 3 schematically shows the arrangement of battery blocks to be contained in the secondary battery module of FIG. 1.
Figure 4:
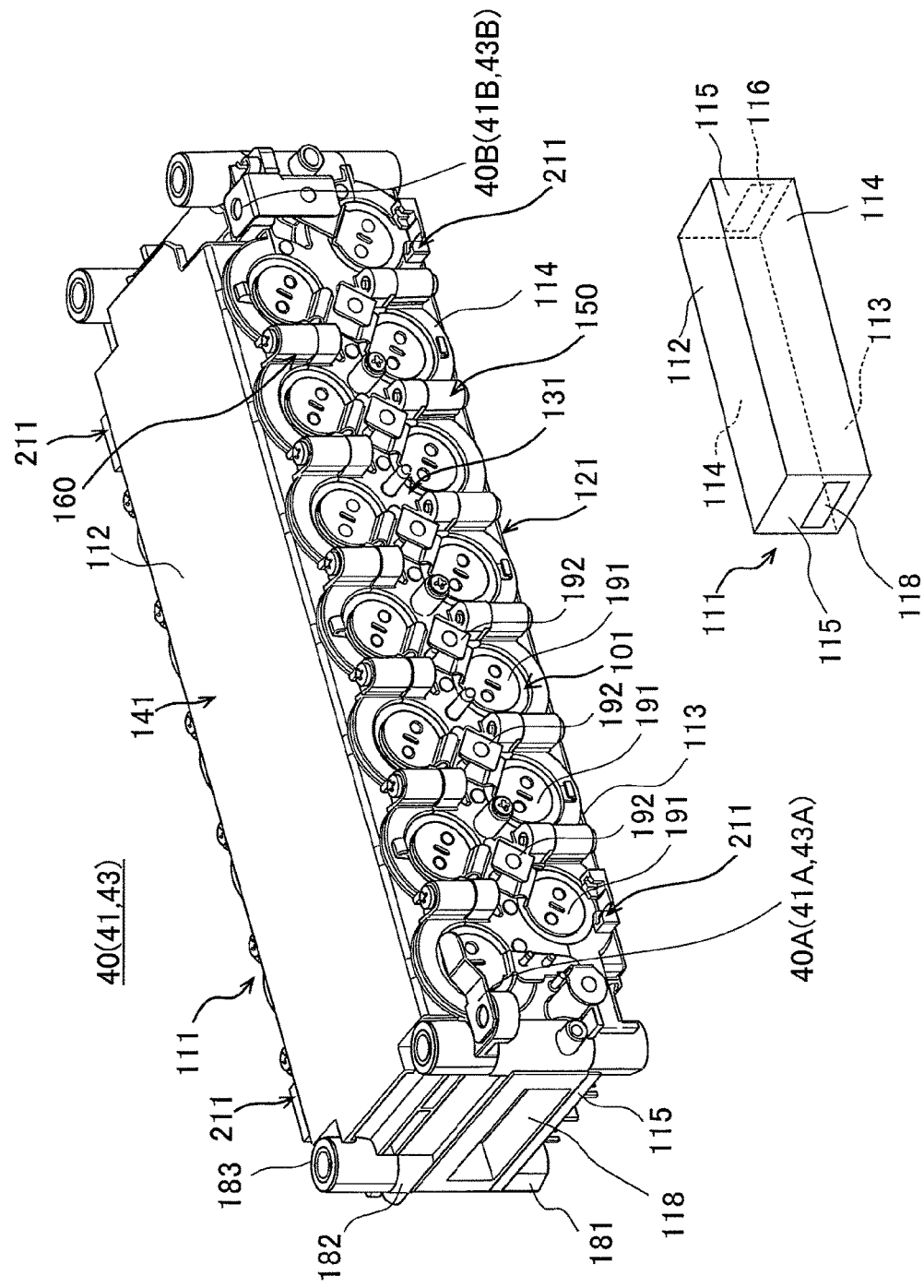
FIG. 4 is a perspective view of a battery block to be contained in the secondary battery module of FIG. 1, showing the configuration on a face and a vent for coolant.
Figure 5:
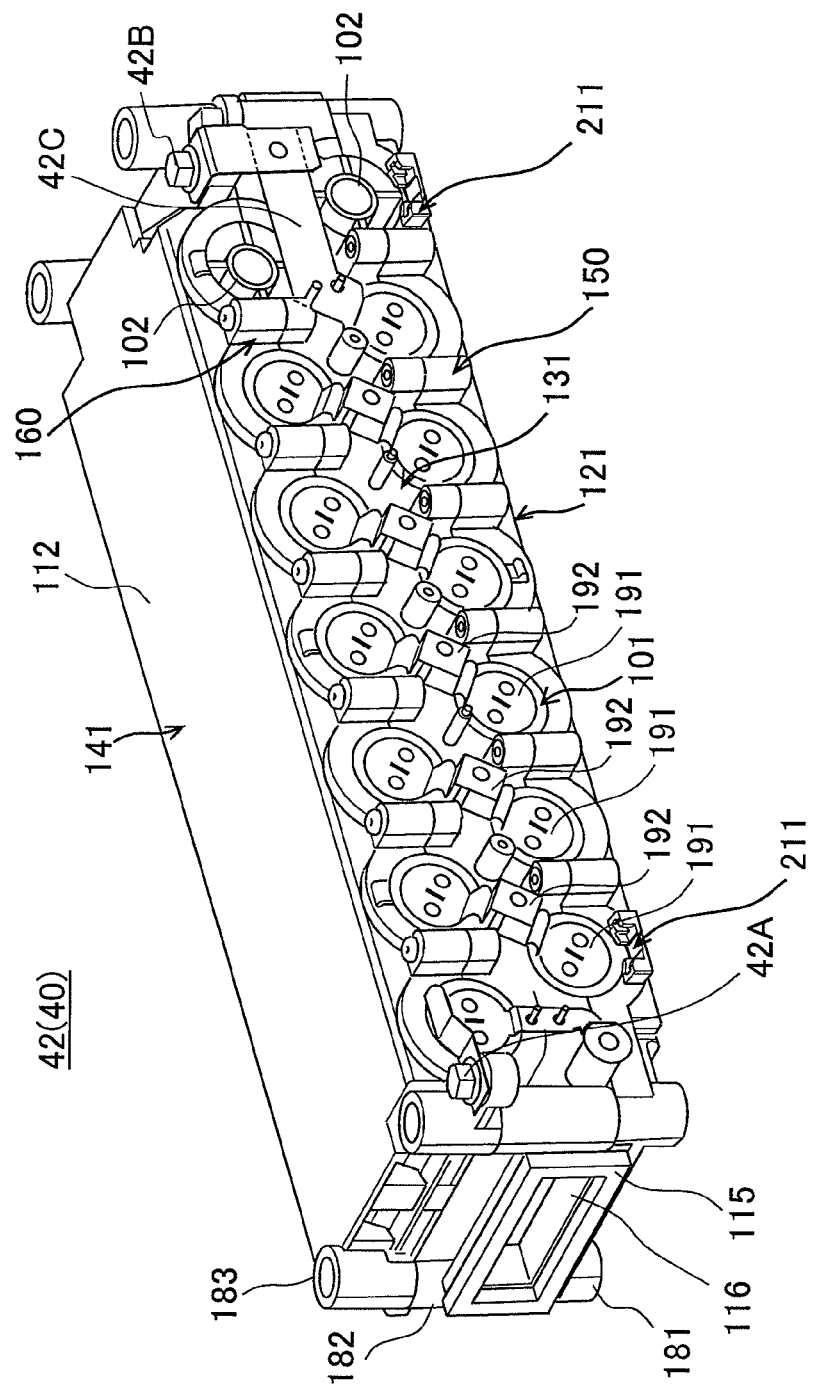
FIG. 5 is a perspective view of another battery block to be contained in the secondary battery module of FIG. 1.

Referring firstly to FIGS. 1 to 5, the overall configuration of the lithium-ion battery device is described below. FIG. 1 is a perspective view showing the exterior configuration of the lithium-ion battery device, where FIG. 1A shows a view from the front left side and FIG. 1B shows a view from the front right side. FIG. 2 is an exploded perspective view of the secondary battery module of FIG. 1, FIG. 3 schematically shows the arrangement of battery blocks, FIG. 4 is a perspective view of a battery block to be contained in the secondary battery module of FIG. 1, showing the configuration on a face and a vent for coolant and FIG. 5 is a perspective view of another battery block to be contained in the secondary battery module of FIG. 1. In the following description, a front side refers to an upstream side of cooling air and a rear side refers to a downstream side of the cooling air irrespective of the attachment position and the orientation of the lithium-ion battery device.

The lithium-ion battery device 1 includes two components of a battery unit 3 and a control unit 4 in a module case 2. As shown in FIGS. 1 and 2, the module case 2 is box-shaped, extending over a plane and having a horizontally-long rectangular shape, and the module case 2 is made up of: a lower case 11 opening upward and having a space for accommodation; and an upper cover 12 closing the upper opening of the lower case 11. The lower case 11 is shaped like a shallow plate having a predetermined depth, and the upper cover 12 is shaped like a flat plate closing the upper part of the lower case 11. The upper cover 12 and the lower case 11 are formed by press-processing or bend-processing of a thin metal plate. The lower case 11 includes a front wall 21 and a rear wall 31 facing each other while having a space therebetween in the front-rear direction of the module case 2. The front wall 21 and the rear wall 31 are provided with an inlet 22 and an outlet 32, respectively, to circulate cooling air as coolant in battery blocks 40. In this illustrated example, three inlets 22 and three outlets 32 are provided so as to correspond to three battery blocks to be accommodated.

In the module case 2, a battery unit accommodation area 2A is provided on one side in the horizontal direction of the module case 2 to accommodate the battery unit 3, and a control unit accommodation area 2B is provided on the other side in the horizontal direction to accommodate the control unit 4.

The battery unit 3 has three battery blocks 40 including a first battery block 41, a second battery block 42 and a third battery block 43. Battery blocks 41 to 43 are each shaped like a long block, and are disposed adjacently in parallel while having their longitudinal directions in parallel. In the present embodiment, these battery blocks are accommodated in the lower case 11 to be extended in the front-rear direction of the module case 2, and the first battery block 41, the second battery block 42 and the third battery block 43 are disposed in this stated order in the direction away from the control unit accommodation area 2B.

As illustrated in FIG. 3 schematically, the battery blocks 41 to 43 are provided with positive electrode terminals 41A to 43A and negative electrode terminals 41B to 43B, respectively, separated on both sides in the longitudinal direction. In the present embodiment, the first battery block 41 and the second battery block 42 are disposed in parallel so that an end on the side of the positive electrode terminal 41A of the first battery block 41 faces an end on the side of the negative electrode terminal 42B of the second battery block 42 and so that an end on the side of the negative electrode terminal 41B of the first battery block 41 faces an end on the side of the positive electrode terminal 42A of the second battery block 42.

Then, the second battery block 42 and the third battery block 43 are disposed in parallel so that the end on the side of the negative electrode terminal 42B of the second battery block 42 faces an end on the side of the positive electrode terminal 43A of the third battery block 43 and so that the end on the side of the positive electrode terminal 42A of the second battery block 42 faces an end on the side of the negative electrode terminal 43B of the third battery block 43.

Then, the negative electrode terminal 41B of the first battery block 41 and the positive electrode terminal 42A of the second battery block 42 or the negative electrode terminal 42B of the second battery block 42 and the positive electrode terminal 43A of the third battery block 43 are connected electrically via a bus bar not illustrated. The second battery block 42 and the third battery block 43 are configured to be electrically connected or blocked therebetween using a SD (service disconnect) switch 53. The SD switch 53 is provided as safety mechanism to secure the safety during maintenance and inspection of the lithium-ion battery device 1, including an electric circuit made up of a switch and a fuse connected in series, and a service engineer manipulates this switch for the maintenance and inspection.

The six external terminals from the positive electrode terminal 41A of the first battery block 41 to the negative electrode terminal 43B of the third battery block 43 are arranged so that the battery blocks are connected in series and are connected to an external terminal not illustrated of the control unit 4 via two harness guides 54A, 54B (described later in detail) extending laterally at the upper part of the module case 2. Each battery block 40 includes two voltage detection boards 201 and 202 disposed along side faces in the longitudinal direction and a temperature detection sensor 300, all of which are connected to a controller (not illustrated) of the control unit 4 via a voltage detection line and a sensor line not illustrated that are provided in the harness guides 54A and 54B.

As shown in FIGS. 4 and 5, each battery block 40 includes a holding case 111 to hold a plurality of battery cells 101 therein, and in the present embodiment the battery cells 101 are disposed as two layers of upper and lower layers. As shown in FIG. 4, the holding case 111 has a long hexahedral shape, having an upper face 112 and a lower face 113 facing while having a space therebetween in the vertical direction and extending in the longitudinal direction while keeping a substantially constant width, a pair of vertical walls 114 and 114 facing while having a space therebetween in the short direction and extending along between the long sides of the upper face 112 and the lower face 113 and a pair of end faces 115 and 115 facing while having a space therebetween in the longitudinal direction and extending along between the short sides of the upper face 112 and the lower face 113 and along between the short sides of the pair of vertical walls 114 and 114.

The holding case 111 has, at both ends in the longitudinal direction, vents for coolant to circulate coolant in the battery block 40. The vents for coolant may include openings 116 and 118 provided at the end faces 115 and 115 on both sides in the longitudinal direction of the holding case 111, for example, one of which is an inlet for coolant to let cooling air in the holding case 111 and the other is an outlet for coolant to let the cooling air out from the holding case 111. Then, the holding case 111 has a channel for coolant to let cooling air into the holding case 111 through the inlet for circulation of the cooling air along the longitudinal direction in the holding case 111 and then let the cooling air out through the outlet.

Each battery block 40 is accommodated in the module case 2 so that the front end face 115 of the holding case 111 faces the front wall 21 and any one of the openings 116 and 118 at the end faces 115 faces, as the inlet for coolant, the inlet 22 of the front wall 21. Then, the rear end face 115 of the holding case 111 faces the rear wall 31 so that the other of the openings 116 and 118 of the end faces 115 faces, as the outlet for coolant, the outlet 32 of the rear wall 31.

In the module case 2, the front wall 21 and the front end face 115 of the case are brought into contact and the rear wall 31 and the rear end face 115 of the case are brought into contact, whereby the inlet for coolant at the front end face 115 of the case and the inlet 22 of the front wall 21 communicate with each other and the outlet for coolant at the rear end face 115 of the case and the outlet 32 of the rear wall 31 communicate with each other. In such a state, the front wall 21 and the front end face 115 of the case and the rear wall 31 and the rear end face 115 of the case are in close contact with each other, thus preventing gas from leaking from the module case 2. A seal member may intervene between the front wall 21 and the front end face 115 of the case and between the rear wall 31 and the rear end face 115 of the case.

The front wall 21 and the rear wall 31 of the module case 2 may be provided with an intake duct and an exhaust duct, respectively, not illustrated. For instance, a part of the intake duct may be inserted into the module case 2 through the inlet 22 and be brought into contact with the inlet for coolant at the front end face 115 of the case in the module case 2 so as to communicate with the inside of the holding case 111 for connection. Similarly, a part of the exhaust duct may be inserted into the module case 2 through the outlet 32 and be brought into contact with the outlet for coolant at the rear end face 115 of the case in the module case 2 so as to communicate with the inside of the holding case 111 for connection. In such a configuration, close contact between the front wall 21 and the intake duct and between the rear wall 31 and the exhaust duct can prevent gas in the module case 2 from leaking to the coolant circulation channel. A seal member may intervene between the front wall 21 and the intake duct and between the rear wall 31 and the exhaust duct.

With this configuration, coolant such as air introduced through the inlet 22 of the module case 2 is further introduced to a block 40 through the inlet for coolant of the block, and then is exhausted through the outlet for coolant and the outlet 32 of the module case 2, whereby a plurality of battery cells internally disposed in the battery block 40 can be cooled.

Then, a space area formed at an upper part between the front end face 115 of the case and the inlet 22 of the front wall 21 and a space area formed at an upper part between the rear end face 115 of the case and the outlet 32 of the rear wall 31 are used as a channel for wiring, and the harness guides 54A and 54B are disposed at the space areas, along which wiring connecting the first to the third battery blocks 41 to 43 and the control unit 4 is provided. The wiring provided at the harness guides 54A and 54B includes a harness connecting the negative electrode terminal 43B of the third battery block 43 and the control unit 4, a voltage detection line to transmit a detection signal of voltage at each battery block 41 to 43 to the control unit 4, a sensor line to transmit a detection signal by the temperature detection sensor 300 to the control unit 4 and the like.

<Battery Block>

Figure 6:
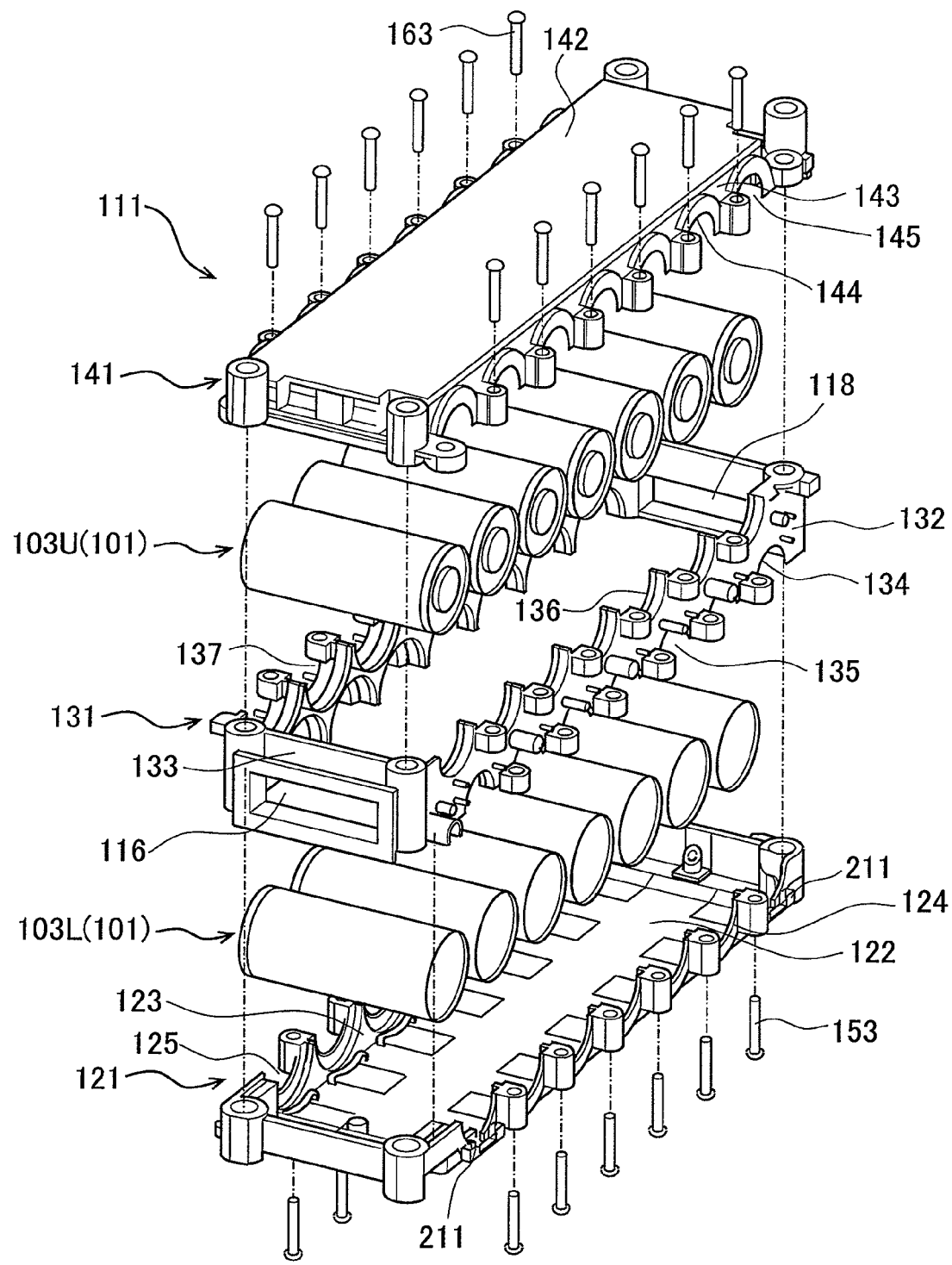
FIG. 6 is an exploded perspective view of the battery block of FIG. 4.
Figure 7:
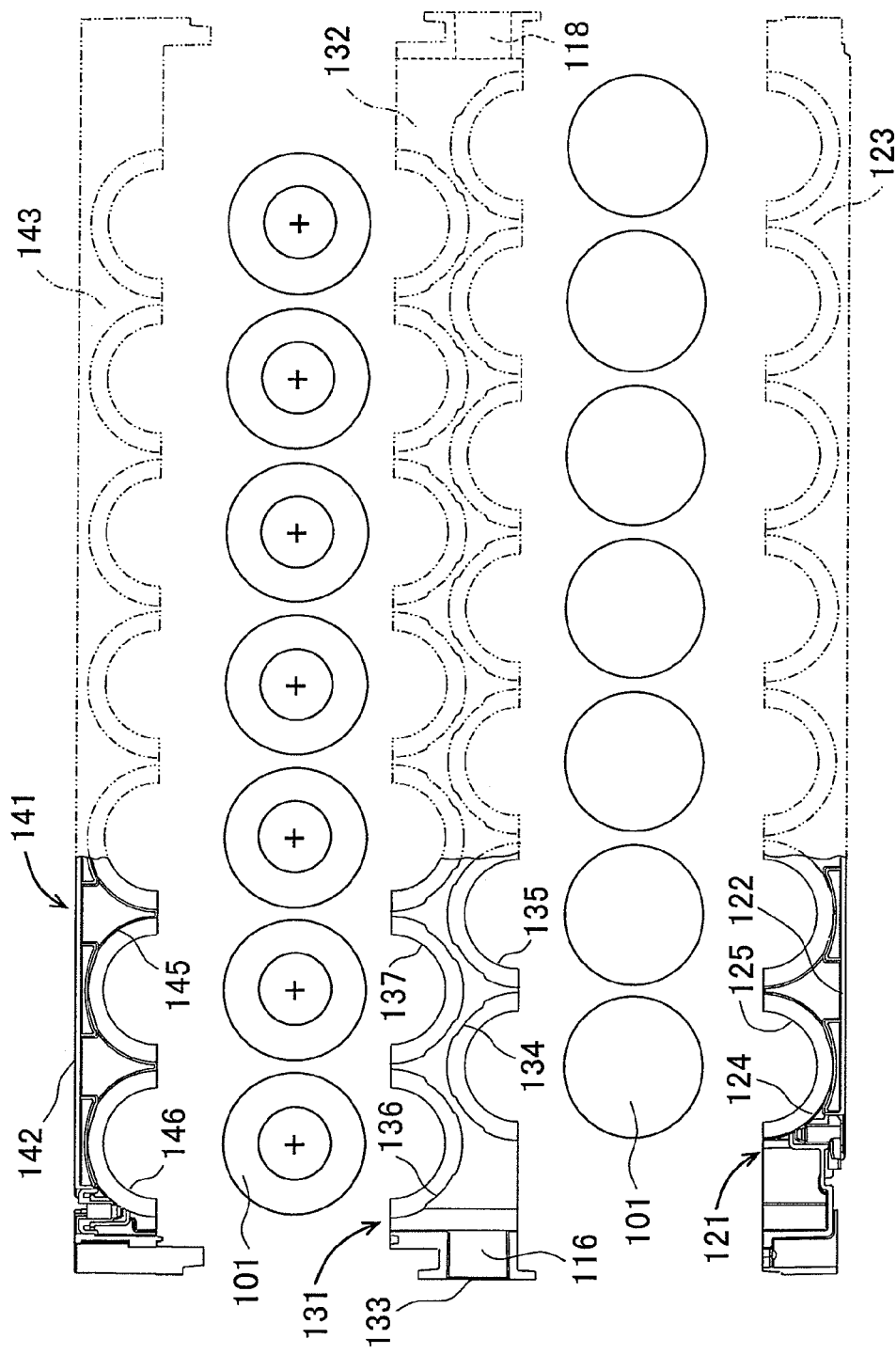
FIG. 7 is an exploded cross-sectional view of the battery block of FIG. 4.

The following describes the configuration of a battery block in the present embodiment in detail. FIG. 6 is an exploded perspective view of the battery block of FIG. 4, and FIG. 7 is an exploded cross-sectional view of the battery block of FIG. 4.

Figure 8:
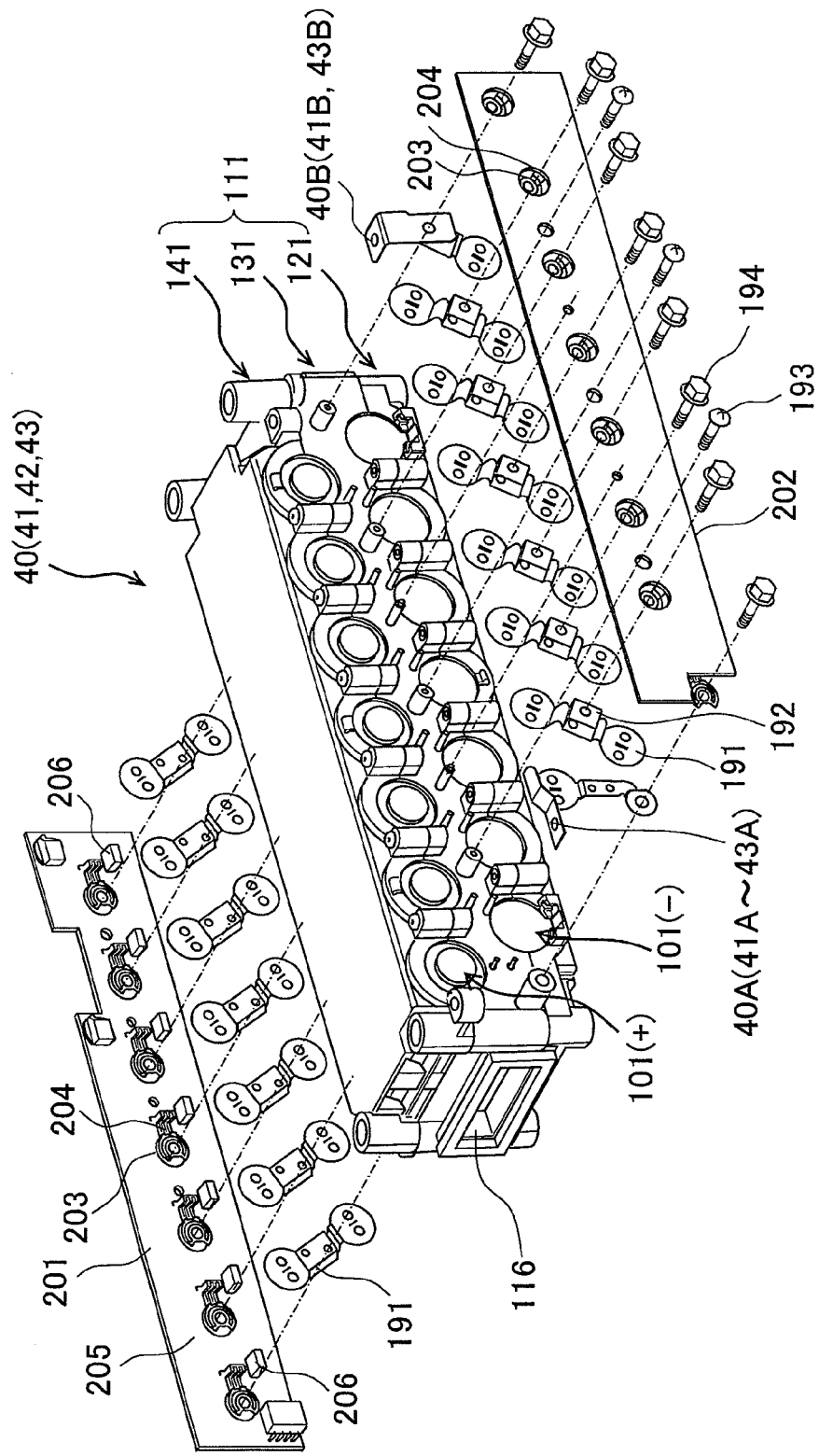
FIG. 8 is an exploded perspective view showing the state of the battery block of FIG. 4, from which conductive members are disassembled and prior to incorporation of a voltage detection board thereto.
Figure 9:
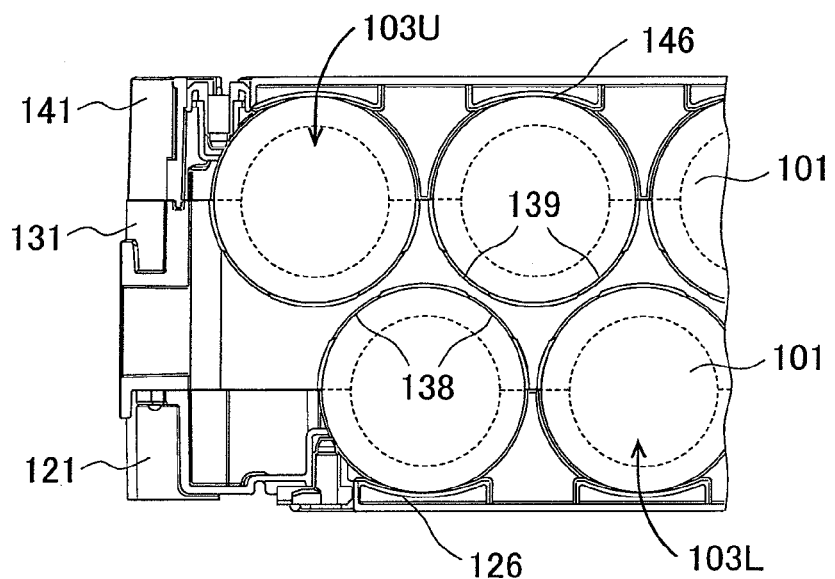
FIG. 9 is a cross-sectional view of a major part of the battery block of FIG. 4.
Figure 10:
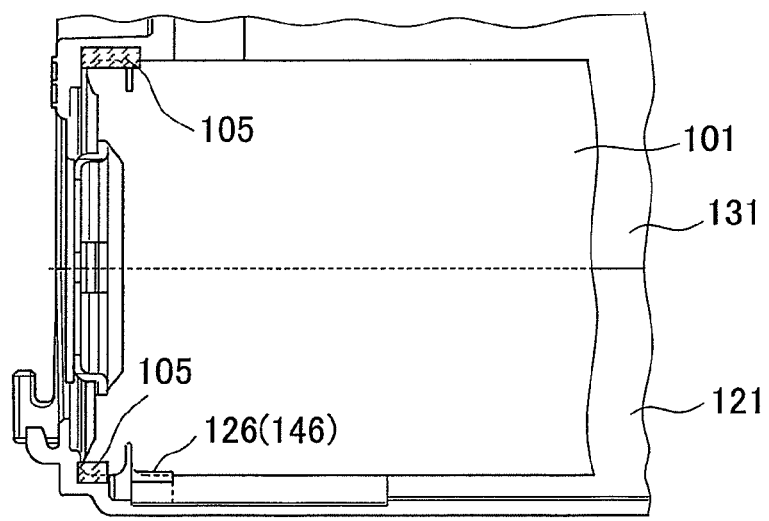
FIG. 10 is a cross-sectional view of showing a major part of a holding part in the battery block of FIG. 4 in detail.
Figure 11:
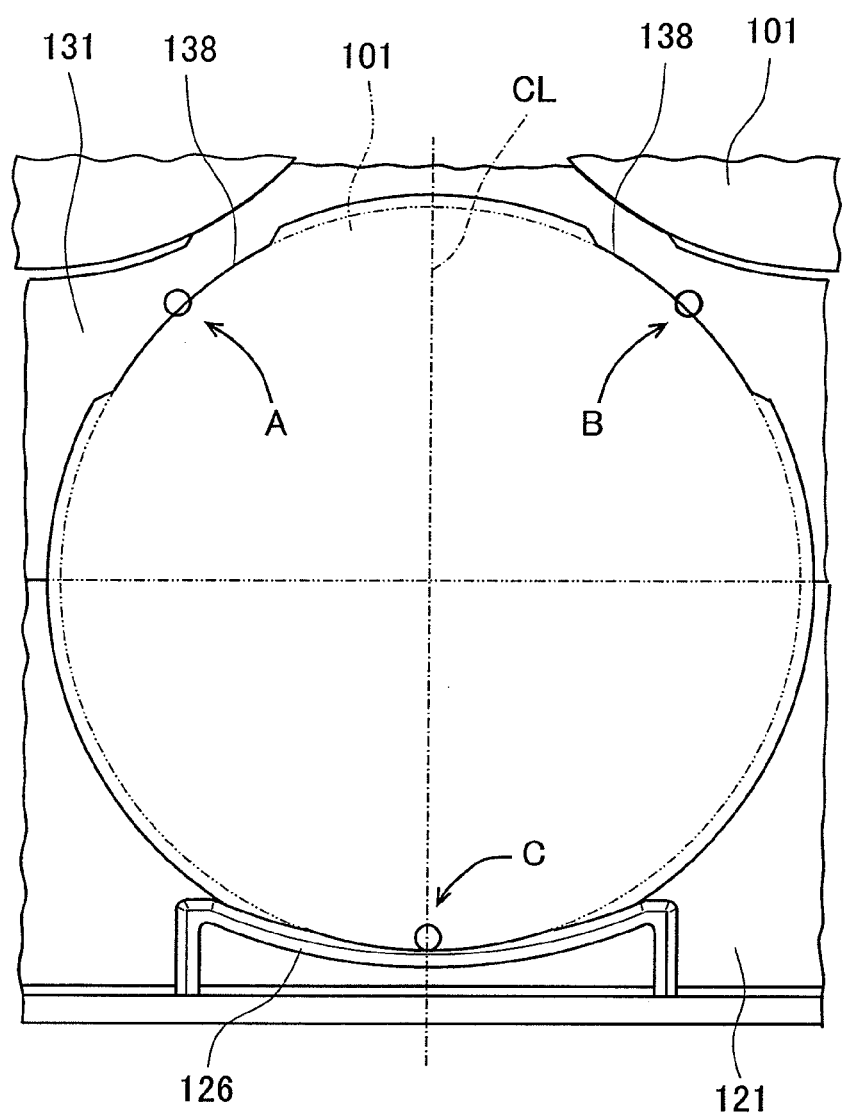
FIG. 11 is a front view of a major part of the holding part of FIG. 9.

FIG. 8 is an exploded perspective view showing the state of the battery block of FIG. 4, from which conductive members are disassembled and prior to incorporation of a voltage detection board thereto, FIG. 9 is a cross-sectional view of a major part of the battery block of FIG. 4, FIG. 10 is a cross-sectional view showing a major part of a holding part in the battery block of FIG. 4 in detail and FIG. 11 is a front view of a major part of the holding part of FIG. 9.

Among the battery blocks 40, the first battery block 41 and the third battery block 43 are disposed in the module case 2 so that the positive electrode terminals 41A and 43A and the negative electrode terminals 41B and 43B are directed to the same directions. On the other hand, the second battery block 42 is disposed between the first battery block 41 and the third battery block 43 so that the positive electrode terminal 42A and the negative electrode terminal 42B are directed to the directions opposite of those of the first battery block 41 and the third battery block 43.

Although these three first to third battery blocks 41 to 43 have basically the same appearance configuration, the first battery block 41 and the third battery block 43 include fourteen battery cells, whereas the second battery block 42 includes twelve battery cells and two dummy cells 102.

In the first battery block 41 and the third battery block 43, fourteen battery cells 101 are arranged. Then, a positive electrode and a negative electrode of neighboring battery cells are connected obliquely via a conductive member 191, and the leading battery cell 101 and the final battery cell 101 are each connected to an externally leading terminal, thus connecting to the positive electrode terminal 40A(41A, 43A) and the negative electrode terminal 40B(41B, 43B).

Since the second battery block 42 has a space for fourteen battery cells, two dummy cells 102 are disposed at end parts for filling the space. In the second battery block 42, the twelve battery cells 101 are connected between neighboring positive electrode and negative electrode via the conductive member 191, and as shown in FIG. 5, the final battery cell 101 adjacent to the dummy cells 102 is connected to an external leading terminal 42C having a shape to bypass the dummy cells 102. The external leading terminal 42C is withdrawn from the electrode of the lower battery cell 101 at the lower stage toward the obliquely upward dummy cell 102, then is bent at a center in the height direction of the second battery block 42 to be extended outwardly in the longitudinal direction of the second battery block 42 and is connected to the negative electrode terminal 42B at an end of the second battery block 42. In this way, not only in the first and the third battery block 41 and 43 but also in the second battery block 42 including the dummy cells 102, external terminals can be disposed at the end positions of the second battery block 42, so that the plurality of battery blocks 40 can be accommodated and assembled with the same steps. The negative electrode terminal 42B may be a terminal on the positive electrode side.

Each battery block 40 is configured to hold a plurality of battery cells 101 in the holding case 111, the battery cells 101 being electrically connected in series via conductive members to be an assembled battery. The battery cells 101 used may be lithium-ion secondary batteries.

Each battery cell 101 has a cylindrical structure, including a battery can that is filled with electrolyte solution, inside of which components such as battery elements and a safety valve are contained. The safety valve on the positive electrode side is a cleave valve that cleaves when the internal pressure of the battery can exceeds a predetermined pressure due to abnormality such as overcharge. The safety valve functions as a fuse mechanism due to the cleave to block an electric connection between the battery lid and the positive electrode side of the battery element and functions as a pressure-reduction mechanism as well to eject gas internally generated in the battery can, that is, mist-form carbon-containing gas (ejection) including the electrolyte solution to the outside of the battery can.

The negative electrode side of the battery can also is provided with a cleave groove that cleaves when the internal pressure of the battery can exceeds a predetermined pressure due to abnormality such as overcharge. As such, gas internally generated in the battery can be ejected from the negative electrode side as well. The lithium-ion secondary battery has a nominal output voltage of 3.0 to 4.2 V and a nominal average output voltage of 3.6 V.

The holding case 111 is configured to hold the lamination of battery cell arrangements 103, each battery cell arrangement 103 including a plurality of battery cells 101 on their sides and in parallel so that the center axes of the battery cells 101 are extended along between the pair of end faces 114 and 114 in the short direction of the holding case 111.

The battery cell arrangement 103L at the lower layer and the battery cell arrangement 103U at the upper layer are held while being displaced from each other in the direction of the line, and in the present embodiment, they are held while being displaced by a distance corresponding to a half size of the battery cell in the longitudinal direction of the holding case 111. That is, the battery cell arrangement 103L at the lower layer and the battery cell arrangement 103U at the upper layer have the same arrangement pitch while being displaced by a half of the pitch between the upper and the lower arrangements. In this way, the battery cell arrangement 103L at the lower layer and the battery cell arrangement 103U at the upper layer are held being displaced from each other in the direction of the line, whereby the battery cell arrangement 103L at the lower layer and the battery cell arrangement 103U at the upper layer can be brought closer to each other so as to shorten the dimension in the direction orthogonal to the line direction. This can reduce the dimension in the height direction of the assembled battery as a whole, and so the height of the battery block 40 can be lowered.

The battery cell arrangement 103L at the lower layer and the battery cell arrangement 103U at the upper layer are arranged so that the positive electrodes and the negative electrodes of the battery cells 101 are in opposite directions. That is, the battery cell arrangement 103L at the lower layer is held so that the positive electrodes of their battery cells 101 are located on one side of the short direction of the holding case 111 and the battery cell arrangement 103U at the upper layer is held so that the positive electrodes of their battery cells 101 are located on the other side of the short direction of the holding case.

The holding case 111 includes three parts made up of a lower holding frame 121, a middle holding frame 131 and an upper holding frame 141, and the lower holding frame 121 and the middle holding frame 131 sandwich the battery cell arrangement 103L at the lower layer for holding and the middle holding frame 131 and the upper holding frame 141 sandwich the battery cell arrangement 103U at the upper layer for holding.

The holding case 111 in an assembled state forms a channel for cooling that extends in the longitudinal direction inside the case, to which the battery cells 101 are exposed, and at the pair of end faces 115, 115 of the holding case 111, the openings 116 and 118 are formed, respectively, so as to communicate with both ends of the channel. That is, a small space is defined between the outer peripheral faces of the battery cells 101 disposed up and down, and along this space, air as coolant comes in through the opening 116 on one side and flows to go outside through the opening 118 on the other side, whereby the battery cells are cooled.

One of the openings 116 and 118 may be either one of the inlet for coolant and the outlet for coolant and the other opening may be the remaining one depending on the direction of putting the battery block 40 in the module case 2, that is, depending on the battery block 40 being used as the first battery block 41 or the second battery block 42 (see FIGS. 3 to 5). In the present embodiment, in the first battery block 41, the opening 116 on the side of the positive electrode 41A is the inlet for coolant and the opening 118 on the side of the negative electrode 41B is the outlet for coolant, and in the second battery block 42, the opening 118 on the side of the negative electrode 42B is the inlet for coolant and the opening 116 on the side of the positive electrode 42A is the outlet for coolant.

As shown in FIG. 6, the lower holding frame 121 includes: a lower face 122 in a flat-plate form extending with a constant lateral width; and a pair of lower vertical walls 123, 123 facing each other and rising upward from both ends in the short direction of the lower face 122. The lower face 122 of the lower holding frame makes up the lower face 113 (see FIG. 4) of the holding case 111, and the lower vertical walls 123, 123 make up a lower part of the pair of vertical walls 114 and 114 of the holding case 111.

The pair of lower vertical walls 123, 123 each include a lower-layer lower supporting part 124 holding the lower parts of the battery cells 101 making up the battery cell arrangement 103L at the lower layer and an opening window part 125 that exposes end faces of the battery cells 101 held by the lower-layer lower supporting part on both sides in the central axis direction. The lower-layer lower supporting part 124 has a part corresponding to each battery cell 101, the part including: a lower-layer downward depression face that is cut in a semicircular shape from the upper side of the lower vertical wall 123 toward the lower face 122 so as to be in contact with the outer peripheral face at the end of the battery cell 101; and a counter face facing the end face of the battery cell 101 in the central axis direction. The lower-layer lower supporting part 124, in cooperation with a lower-layer upper supporting part 134 of middle vertical walls 132, 132 described later, configures a lower holding part to hold the battery cell arrangement 103L at the lower layer while limiting the battery cells 101 so as not to move in the center axis direction and in the radial direction.

The opening window part 125 opens at the lower vertical walls 123, 123, allowing the center parts of the end faces of the battery cells 101 held by the lower-layer lower supporting part 124 to be exposed laterally of the holding case 111.

The middle holding frame 131 includes: a pair of middle vertical walls 132, 132 facing each other and extending while keeping constant width and height; and a pair of end faces 133, 133 provided at both ends of the middle vertical walls 132, 132 in the longitudinal direction along short sides. The middle holding frame 131 is overlaid on the lower holding frame 121 for coupling so that each of the middle vertical walls 132, 132 is continuously connected to the upper part of the corresponding lower vertical wall 123, 123 of the lower holding frame 121, thus forming a center part in the height direction of the vertical walls 114 and 114 of the holding case 111. Then, each end face 133 of the middle holding frame 131 makes up the end face 115 of the holding case 111, thus forming the opening 116 or 118.

The pair of middle vertical walls 132, 132 each include a lower-layer upper supporting part 134 holding the upper parts of the battery cells 101 held by the lower holding frame 121 and an upper-layer lower supporting part 136 holding the lower parts of the battery cells making up the battery cell arrangement at the upper layer. The middle vertical walls 132, 132 further include an opening window part 135 and an opening window part 137 that expose end faces of the battery cells 101 held by the lower-layer upper supporting part 134 on both sides in the central axis direction and end faces of the battery cells 101 held by the upper-layer lower supporting part 136 on both sides in the central axis direction, respectively.

The lower-layer upper supporting part 134 has a part corresponding to each battery cell 101, the part including: a lower-layer upward depression face that is cut in a semicircular shape from the lower side of the middle vertical wall 132 toward the upper side so as to be in contact with the outer peripheral face at the end of the battery cell 101; and a counter face facing the end faces of the battery cell 101 in the central axis direction. The lower-layer upper supporting part 134, in cooperation with the lower-layer lower supporting part 124 of the lower holding frame 121, configures the lower holding part to hold the battery cell arrangement 103L at the lower layer while limiting the battery cells 101 so as not to move in the center axis direction and in the radial direction.

The upper-layer lower supporting part 136 has a part corresponding to each battery cell 101, the part including: an upper-layer downward depression face that is cut in a semicircular shape from the upper side of the middle vertical wall 132 toward the lower side so as to be in contact with the outer peripheral face at the end of the battery cell 101; and a counter face facing the end face of the battery cell 101 in the central axis direction. The upper-layer lower supporting part 136, in cooperation with an upper-layer upper supporting part 144 of the upper holding frame 141 described later, configures an upper holding part to hold the battery cell arrangement 103U at the upper layer while limiting the battery cells 101 so as not to move in the center axis direction and in the radial direction.

In the lower-layer upper supporting part 134 and the upper-layer lower supporting part 136, their parts corresponding to the battery cells are displaced by a distance corresponding to a half size of the battery cell in the longitudinal direction of the middle holding frame 131 so as to hold the battery cell arrangement 103L at the lower layer and the battery cell arrangement 103U at the upper layer while being displaced from each other in the direction of the line, and the center of each part corresponding to the battery cell of the upper-layer lower supporting part 136 is located between the neighboring parts each corresponding to the battery cell of the lower-layer upper supporting part 134. Then, the middle vertical walls 132, 132 have a height shorter than the diameter of the battery cells 101.

The upper holding frame 141 includes: an upper face 142 in a flat-plate form extending with a constant lateral width; and a pair of upper vertical walls 143, 143 facing each other and falling downward from both ends in the short direction of the upper face 142. The upper face 142 of the upper holding frame 141 makes up the upper face 112 (see FIG. 4) of the holding case 111, and the upper vertical walls 143, 143 make up an upper part of the vertical walls 114 and 114 of the holding case 111.

The pair of upper vertical walls 143, 143 each include an upper-layer upper supporting part 144 holding the upper parts of the battery cells 101 making up the battery cell arrangement 103U at the upper layer and an opening window part 145 that exposes end faces of the battery cells 101 held by the upper-layer upper supporting part 144 on both sides in the central axis direction.

The upper-layer upper supporting part 144 has a part corresponding to each battery cell 101, the part including: an upper-layer upward depression face that is cut in a semicircular shape from the lower side of the upper vertical wall 143 toward the upper face 142 so as to be in contact with the outer peripheral faces at the ends of the battery cell 101; and a counter face facing the end face of the battery cell 101 in the central axis direction. The upper-layer upper supporting part 144, in cooperation with the upper-layer lower supporting part 136 of the middle holding frame 131, configures the upper holding part to hold the battery cell arrangement 103U at the upper layer while limiting the battery cells 101 so as not to move in the center axis direction and in the radial direction.

The opening window part 145 opens at the upper vertical walls 143, 143, allowing the center parts of the end faces of the battery cells 101 held by the upper-layer upper supporting part 144 to be exposed laterally of the holding case 111. This opening window part 145 and the opening window part 137 of the middle holding frame 131 define circular openings, and the opening window part 125 of the lower holding frame 121 and the opening window part 135 of the middle holding frame 131 define circular openings. Through these openings, electrodes of the battery cells 101 are exposed, to which the conductive members 191 for connection are fixed by welding or the like.

In each battery block 40 of the present embodiment, a plurality of battery cells 101 are provided so that the center axes of their circular shape are aligned in parallel in the battery block 40, and the outer peripheral faces of the battery cells 101 are sandwiched in the radial direction for fixing between two holding members facing each other. That is, in the battery cell arrangement 103L at the lower layer including a plurality of battery cells 101 aligned, their battery cells are sandwiched for holding and fixing from above and below in the radial direction between two holding members including the lower holding frame 121 and the middle holding frame 131. Then, in the battery cell arrangement 103U at the upper layer including a plurality of battery cells 101 aligned, their battery cells are sandwiched for holding and fixing from above and below in the radial direction between two holding members including the middle holding frame 131 and the upper holding frame 141.

The following describes contact parts between the battery cells 101 and the three holding members, i.e., the lower holding frame 121, the middle holding frame 131 and the upper holding frame 141.

In FIGS. 9 to 11, the lower holding frame 121 is formed with the lower-layer downward depression face in a semicircular shape having a radius slightly larger than the radius of the outer peripheral faces of the battery cells 101 of the battery cell arrangement 103L at the lower layer, and along this lower-layer downward depression face, a pressing part 126 made of resin, having a substantially M-letter shape in parallel along the lower-layer downward depression face and being elastic deformable, is integrally formed. The middle holding frame 131 is formed with the lower-layer upward depression face in a semicircular shape having a radius slightly larger than the radius of the outer peripheral faces of the battery cells, and the lower-layer upward depression face is formed with two protrusions 138. As shown in FIG. 11, each pressing part 126 is formed on the center line CL of the battery cell 101, and the two protrusions 138 are formed symmetrically with reference to the center line CL. The center line CL is defined as a line passing through the center axis of a battery cell 101 held between the lower holding frame 121 and the middle holding frame 131 and extending vertically. These upper and lower semicircular-shaped lower-layer downward depression face and lower-layer upward depression face are combined, whereby circular depression faces are formed, thus surrounding ends of the battery cells in the axial direction from the outside of the radial direction.

Similarly to the battery cell arrangement 103L at the lower layer, the upper holding frame 141 is formed with the upper-layer upward depression face in a semicircular shape having a radius slightly larger than the radius of the outer peripheral faces of the battery cells of the battery cell arrangement 103U at the upper layer, and along this upper-layer upward depression face, a pressing part 146 made of resin, having a substantially M-letter shape in parallel along this upper-layer upward depression face and being elastic deformable, is integrally formed. Then, the middle holding frame 131 is formed with the upper-layer downward depression face in a semicircular shape having a radius slightly larger than the radius of the outer peripheral faces of the battery cells, and the upper-layer downward depression face is formed with two protrusions 139. Each pressing part 146 is formed on the center line CL of the battery cell 101, and the two protrusions 139 are formed symmetrically with reference to the center line CL. These upper and lower semicircular-shaped upper-layer downward depression face and upper-layer upward depression face are combined, whereby circular depression faces are formed, thus surrounding ends of the battery cells in the axial direction from the outside of the radial direction.

As shown in FIG. 11, the outer peripheral face of each battery cell 101 of the battery cell arrangement 103L at the lower layer is in contact with the two protrusions 138 in the radial direction at contact points A and B and the battery cell 101 is pushed by one pressing part 126 internally in the radial direction at a point C of the pressing part 126, and the two points A and B are symmetrical with reference to the center line CL passing through the point C and the center of the axis. Similarly, the outer peripheral face of each battery cell 101 of the battery cell arrangement 103U at the upper layer is in contact with the two protrusions 139 in the radial direction at contact points A and B and the battery cell 101 is pushed by one pressing part 146 internally in the radial direction at a point C of the pressing part 146, and the two points A and B are symmetrical with reference to the center line CL passing through the point C and the center of the axis. More specifically, these points are preferably located on the isoscleis triangle having a vertex at one point of the pressing part 126, 146. Alternatively, these three points may be located at vertexes of a regular triangle.

As shown in detail in FIG. 11, the plurality of battery cells 101 at the lower layer are held in a balanced manner and securely from three directions at three points of the outer peripheral faces thereof so that the two protrusions 138 of the middle holding frame 131 are in contact with upper parts of the outer peripheral faces and the pressing parts 126 of the lower holding frame 121 press the battery cells 101 upward. Meanwhile, the plurality of battery cells 101 at the upper layer are held in a balanced manner and securely from three directions at three points of the outer peripheral faces thereof so that the two protrusions 139 of the middle holding frame 131 are in contact with lower parts of the outer peripheral faces and the pressing parts 146 of the upper holding frame 141 press the battery cells 101 downward. As a result, in the case of the battery cells 101 aligned having slightly different diameters of the outer peripheral faces, the upper and lower pressing parts 126 and 146 are deformed so as to absorb the tolerance of the diameter of the outer peripheral faces, and so vibration of the battery cells 101, even having different diameters, can be suppressed and the battery cells can be held for fixing stably. Since vibrations of the battery cells 101 can be suppressed, no load will be applied to parts such as the conductive member 191 connected to the positive electrode and the negative electrode of the battery cell 101 via welding or the like, the positive electrode terminal 40A and the negative electrode terminal 40B, and so breaking of wire and contact failures can be prevented.

The above-description exemplifies the case where the pressing parts 126 and 146 are formed at the lower holding frame 121 and the upper holding frame 141, respectively, and the protrusions 138 and 139 are formed at the middle holding frame 131. Conversely, two protrusions may be formed at each of the lower holding frame 121 and the upper holding frame 141, and the pressing parts may be formed at the middle holding frame 131. Alternatively, two protrusions may be formed at the lower holding frame 121, a pressing part may be formed at a lower part of the middle holding frame 131, a protrusion may be formed at an upper part of the middle holding frame and a pressing part may be formed at a lower part of the upper holding frame 141. In this configuration, the self weight of the battery cells 101 does not act on the pressing parts, and so durability of the pressing part can be improved.

Figure 12A:
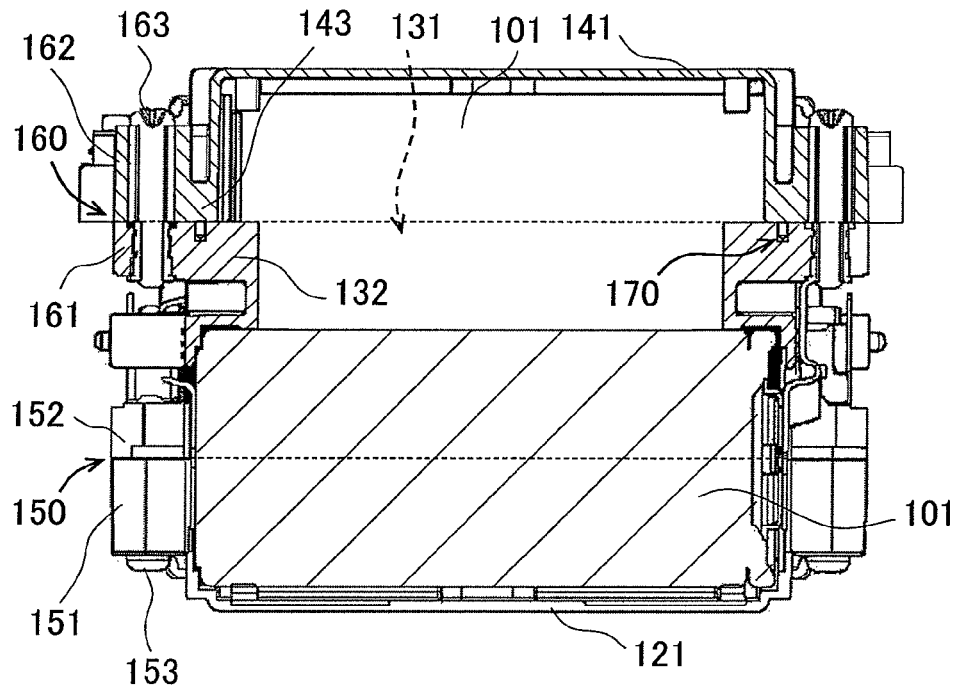
FIG. 12A is a cross-sectional view of fastening means and alignment means of the battery block of FIG. 4 after fastening.
Figure 12B:
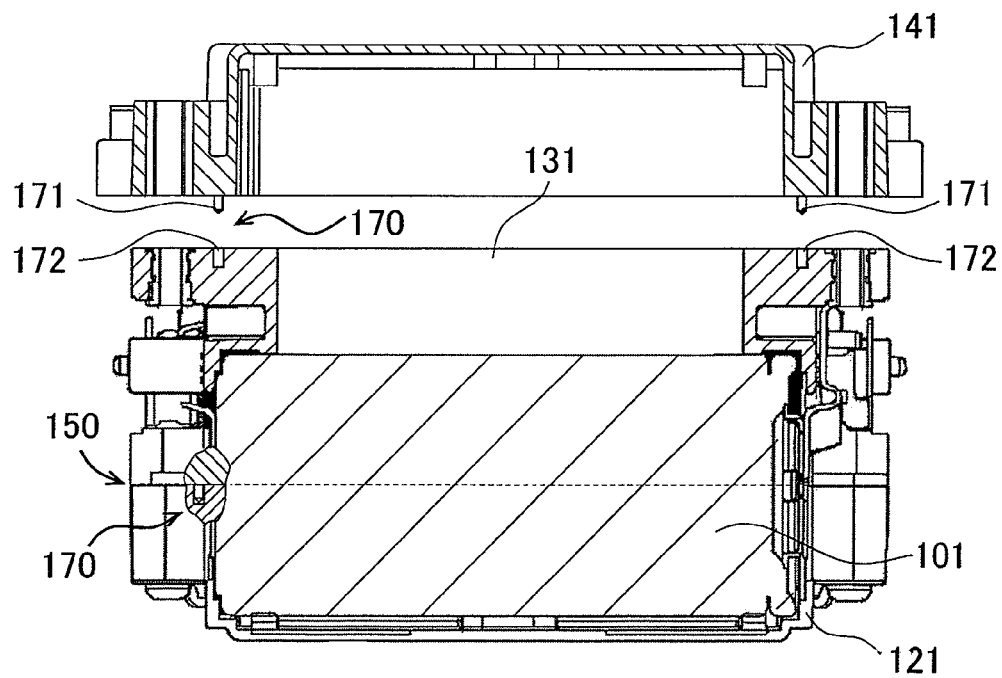
FIG. 12B is a cross-sectional view of the fastening means and the alignment means of the battery block of FIG. 4 before fastening.

In each battery block 40 of the present embodiment, the holding case 111 includes lower coupling means 150 coupling the lower holding frame 121 and the middle holding frame 131 and upper coupling means 160 coupling the middle holding frame 131 and the upper holding frame 141. The lower coupling means couples the lower holding frame 121 with the middle holding frame 131 while overlaying the middle holding frame 131 on the lower holding frame 121, and the upper coupling means couples the middle holding frame 131 with the upper holding frame 141 while overlaying the upper holding frame 141 on the middle holding frame 131. Referring now to FIGS. 12A and 12B, the coupling means 150, 160 is described below.

FIG. 12A is a cross-sectional view of fastening means and alignment means of the battery block of FIG. 4 after fastening, and FIG. 12B is a cross-sectional view of the fastening means and the alignment means of the battery block of FIG. 4 before fastening. In FIGS. 12A and 12B, the upper coupling means 160 is configured to fasten fastening bosses 161 and fastening bosses 162 with upper fastening screws 163, the fastening bosses 161 protruding laterally from the pair of middle vertical walls 132, 132 of the middle holding frame 131 and the fastening bosses 162 protruding laterally from the pair of upper vertical walls 143 facing each other and falling downward from both ends in the short direction of the flat-plate shaped upper face 142 of the upper holding frame 141, thus fastening the upper holding frame 141 at an upper part of the middle holding frame 131 for fixing. The fastening bosses 162 of the upper holding frame 141 are formed at middle positions of neighboring semi-circles of the upper-layer upward depression face to support the plurality of battery cells, the semi-circles being cut from the lower sides of the upper vertical walls 143, 143 to the upper face 142 so as to fasten between the plurality of battery cells located at the upper layer with the upper fastening screws 163, whereby the battery cells 101 can be held firmly with the uniform holding force applied to each battery cell.

Similarly, the lower coupling means 150 is configured to fasten fastening bosses 151 and fastening bosses 152 with lower fastening screws 153, the fastening bosses 151 protruding laterally from the pair of lower vertical walls facing each other and rising upward from both ends in the short direction of the flat-plate shaped lower face of the lower holding frame 121 and the fastening bosses 152 protruding laterally from the pair of middle vertical walls of the middle holding frame 131, thus fastening the middle holding frame 131 at an upper part of the lower holding frame 121 for fixing. The fastening bosses 151 of the lower holding frame 121 are formed at middle positions of neighboring semi-circles of the lower-layer downward depression face to support the plurality of battery cells 101, the semi-circles being cut from the upper sides of the lower vertical walls 123, 123 to the lower face 122 so as to fasten between the plurality of battery cells located at the lower layer with the lower fastening screws 153, whereby the battery cells 101 can be held firmly with the uniform holding force applied to each battery cell.

In this way, the upper coupling means 160 is configured to fasten the six fastening bosses 161 formed at the upper holding frame 141 and the six fastening bosses 162 formed at the middle holding frame 131 for the seven battery cells at the upper layer with the six fastening screws 163, whereby the seven battery cells, even having different outer diameters, can be held for fixing uniformly by fastening a part near each battery cell. Then, the lower coupling means 150 is configured to fasten the six fastening bosses 151 formed at the lower holding frame 121 and the six fastening bosses 152 formed at the middle holding frame 131 for the seven battery cells at the lower layer with the six fastening screws 153, whereby the seven battery cells, even having different outer diameters, can be held for fixing uniformly by fastening a part near each battery cell. In this way, in the battery cell arrangements 103 sandwiched between the holding frames coupled by the lower coupling means 150 and the upper coupling means 160, slight movement of the battery cells 101 due to vibrations or the like can be prevented, thus reducing a load applied to the welding parts of the conductive members 191 connected to the electrodes of the battery cells by welding or the like.

Further as shown in FIG. 12A and FIG. 12B, the lower holding frame 121, the middle holding frame 131 and the upper holding frame 141 of the holding case 111 are provided with alignment means 170 for precise assembly between the components of the lower holding frame 121 and the middle holding frame 131 and between the components of the middle holding frame 131 and the upper holding frame 141.

This alignment means 170 includes a protrusion formed at a counter face of a counter member on one side and a recess formed at a counter face of a counter member on the other side so as to let the protrusion fit therein. In one example, at four corners of the counter faces of the middle holding frame 131 and the upper holding frame 141, protrusions 171 are formed as the alignment means, protruding downward from the upper holding frame 141, and recesses 172 opening upward are formed at the middle holding frame 131 so as to let the protrusions 171 fit therein. These four protrusions 171 and recesses 172 are formed, and mutual fitting therebetween allows the middle holding frame 131 and the upper holding frame 141 to be aligned so as to have a determined positional relationship. This configuration facilitates screwing of the upper fastening screws 163 of the upper coupling means 160.

Then as shown in FIG. 12B, at four corners of the counter faces of the lower holding frame 121 and the middle holding frame 131, protrusions 171 are formed so as to protrude downward from the middle holding frame 131, and recesses 172 opening upward are formed at the lower holding frame 121 so as to let the protrusions 171 fit therein. These four protrusions 171 and recesses 172 are formed, and mutual fitting therebetween allows the lower holding frame 121 and the middle holding frame 131 to be aligned so as to have a determined positional relationship. This configuration facilitates screwing of the lower fastening screws 153 of the lower coupling means 150. Note that the protrusions and the recesses for alignment may be exchanged so that the protrusions are provided at the lower holding frame 121 and the corresponding recesses are provided at the lower face of the middle holding frame 131 and so that the protrusions are provided at the upper face of the middle holding frame 131 and the corresponding recesses are provided at the lower face of the upper holding frame 141. In this way, the protrusions and the recesses for alignment are appropriately combined, whereby erroneous assembly of the three parts 121, 131 and 141 can be prevented.

The following describes how to assemble the thus configured holding case 111. Firstly, battery cells 101 are inserted from above of the lower holding frame 121 to be held by the corresponding parts of the lower-layer lower supporting part 124. The battery cells 101 are then held so that their positive electrodes are located on one side in the short direction of the holding case 111, thus making the battery cell arrangement 103L at the lower layer. During the insertion of the battery cells 101 to the lower holding frame 121, an elastic adhesive is applied at a narrow width on the outer peripheral faces adjacent to the positive electrodes and the negative electrodes, whereby an adhesive layer 105 (see FIG. 10) is formed.

Next, the middle holding frame 131 is overlaid on the lower holding frame 121 so that the fastening bosses 151 protruding laterally from the lower vertical walls 123, 123 of the lower holding frame 121 and the fastening bosses 152 protruding laterally from the pair of middle vertical walls 132, 132 of the middle holding frame 131 are overlapped, followed by insertion of the lower fastening screws 153 from the lower fastening bosses 151 to be screwed in the upper fastening bosses 152, thus coupling these fastening bosses. At this time, the lower holding frame 121 and the middle holding frame 131 can be easily aligned by fitting the protrusions 171 into the recesses 172 as the alignment means, and so the fastening bosses 151, 152 can be easily aligned and the lower fastening screws 153 can be inserted easily. This screwing operation is performed for the six lower fastening screws 153 on one side and for the twelve lower fastening screws 153 on both sides, whereby the lower holding frame 121 can be coupled with the middle holding frame 131.

Needless to say, the lower fastening screws 153 may be screwed from above to below instead form below to above. Thus, the lower holding frame 121 and the middle holding frame 131 are coupled while holding the plurality of battery cells 101 between the lower holding frame 121 and the middle holding frame 131. Since the adhesive layer 105 is formed between the outer peripheral faces of the battery cells 101 and the lower holding frame 121 or the middle holding frame 131, each battery cell 101 is fixed by holding at three positions including the pressing part 126 and the two protrusions 138 as well as the adhesive layer 105.

Then, the battery cells 101 are inserted from above of the middle holding frame 131 to be held by the corresponding parts of the upper-layer lower supporting part 136 of the middle holding frame 131. The battery cells 101 are then held so that their positive electrodes are located on the other side in the short direction of the holding case 111, thus making the battery cell arrangement 103U at the upper layer. Similarly to the above, during the insertion of the battery cells 101 to the middle holding frame 131, an elastic adhesive is applied at a narrow width on the outer peripheral faces adjacent to the positive electrodes and the negative electrodes, whereby an adhesive layer 105 (see FIG. 10) is formed.

Next, the upper holding frame 141 is overlaid on the middle holding frame 131 so that the fastening bosses 161 protruding laterally from the pair of middle vertical walls 132, 132 of the middle holding frame 131 and the fastening bosses 162 protruding laterally from the pair of upper vertical walls 143, 143 of the upper holding frame 141 are overlapped, followed by insertion of the upper fastening screws 163 from the upper fastening bosses 162 to be screwed in the lower fastening bosses 161, thus coupling these fastening bosses.

At this time as well, the middle holding frame 131 and the upper holding frame 141 can be easily aligned by fitting the protrusions 171 into the recesses 172 as the alignment means, and so the fastening bosses 161, 162 can be easily aligned and the upper fastening screws 163 can be inserted easily. This screwing operation is performed for the six upper fastening screws 163 on one side and for the twelve upper fastening screws 163 on both sides, whereby the upper holding frame 141 can be coupled with the middle holding frame 131.

Needless to say, the upper fastening screws 163 may be screwed from below to above instead form above to below. Thus, the middle holding frame 131 and the upper holding frame 141 are coupled while holding the plurality of battery cells 101 between the middle holding frame 131 and the upper holding frame 141. Since the adhesive layer 105 is formed between the outer peripheral faces of the battery cells 101 and the middle holding frame 131 or the upper holding frame 141, each battery cell 101 is fixed by holding at three positions including the pressing part 146 and the two protrusions 139 as well as the adhesive layer 105.

This method to assemble the holding case 111 enables the assembly of components of the holding case 111 from below to above one by one without turning upside down the vertical order of the lower holding frame 121, the middle holding frame 131 and the upper holding frame 141 during the course of the assembly. This facilitates the assembly of the holding case 111, thus reducing the man-hour and so reducing the manufacturing cost.

After the assembly of the holding case 111, then the conductive members 191 are attached to the battery block 40. Thereafter the temperature detection sensor 300 and the voltage detection boards 201 and 202 are attached thereto, and then an insulating resin cover 310 is attached so as to cover the exterior of the voltage detection boards 201 and 202.

Figure 14:
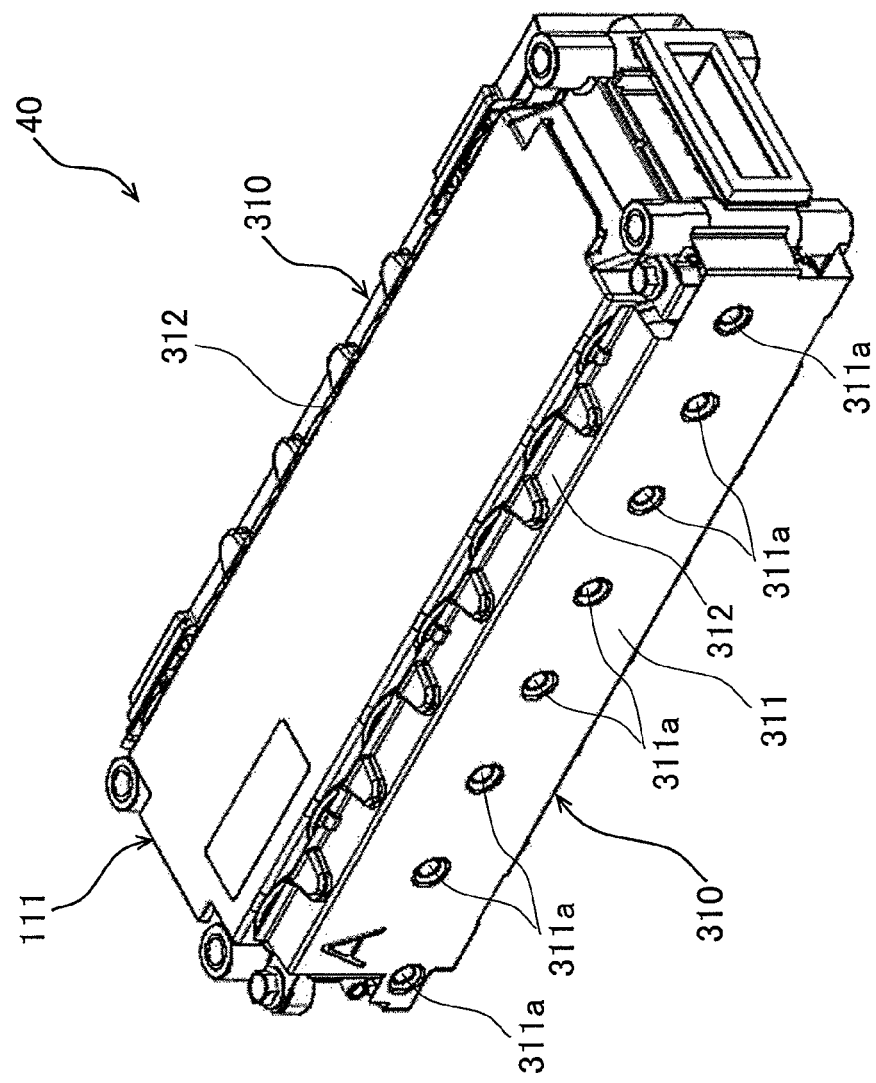
FIG. 14 is a perspective external view of the battery block of FIG. 2.
Figure 15:
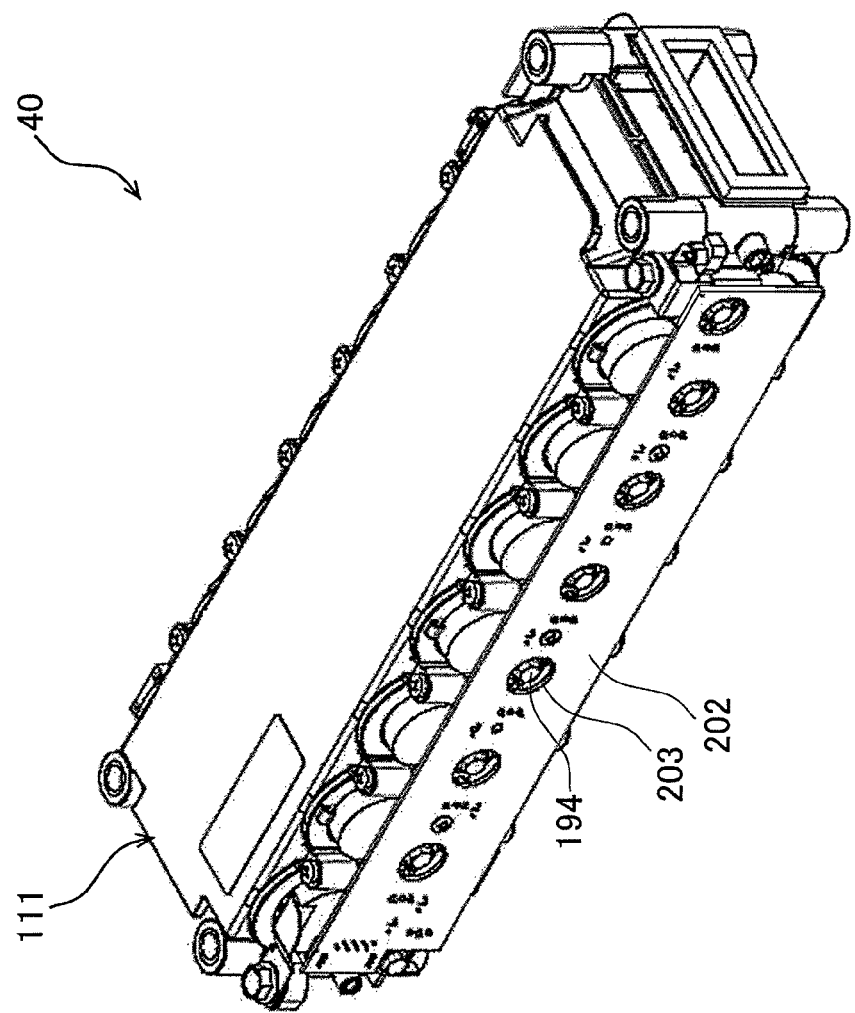
FIG. 15 is a perspective external view of the battery block from which an insulating resin cover is removed.
Figure 16:
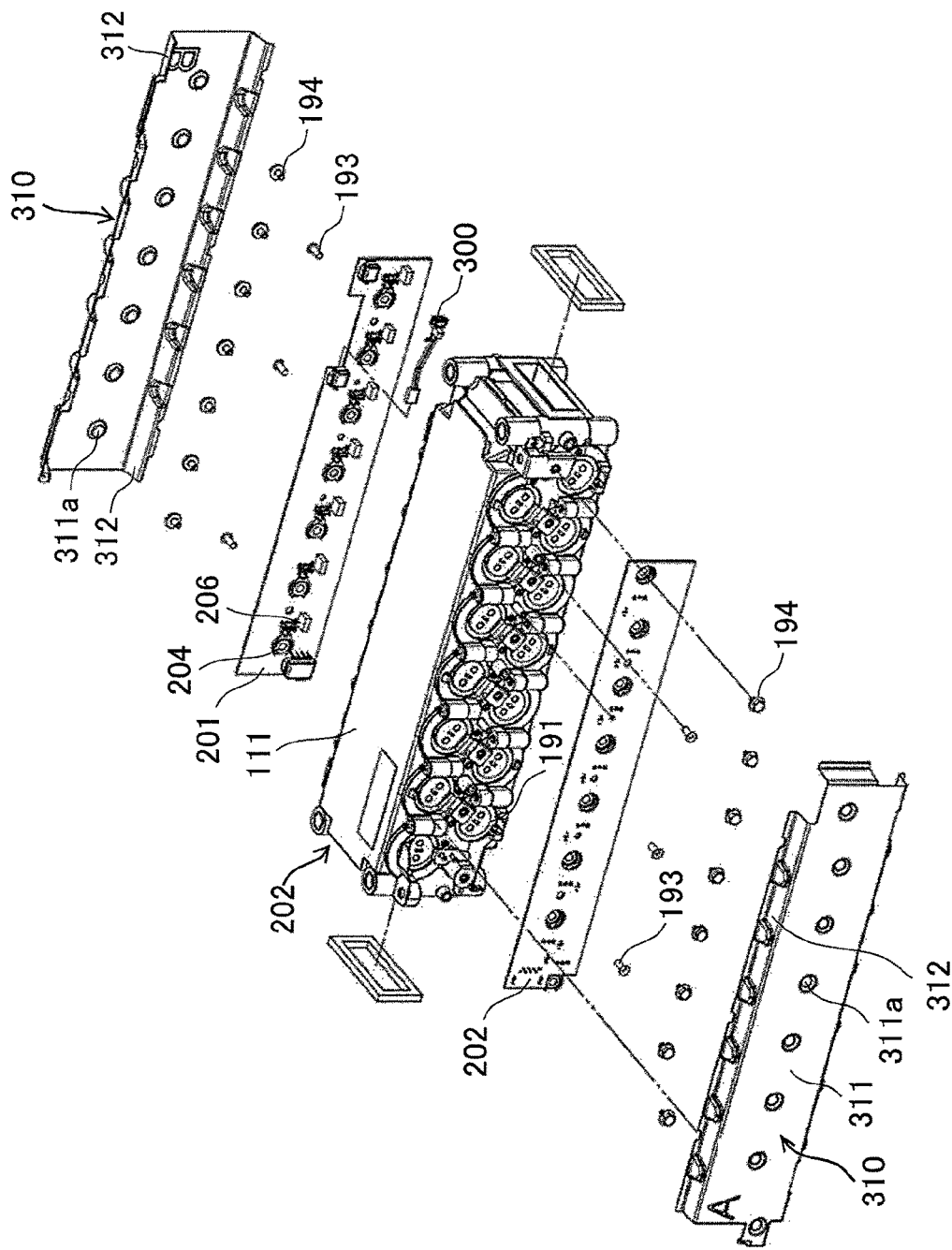
FIG. 16 is an exploded perspective view of the battery block of FIG. 14.
Figure 17:
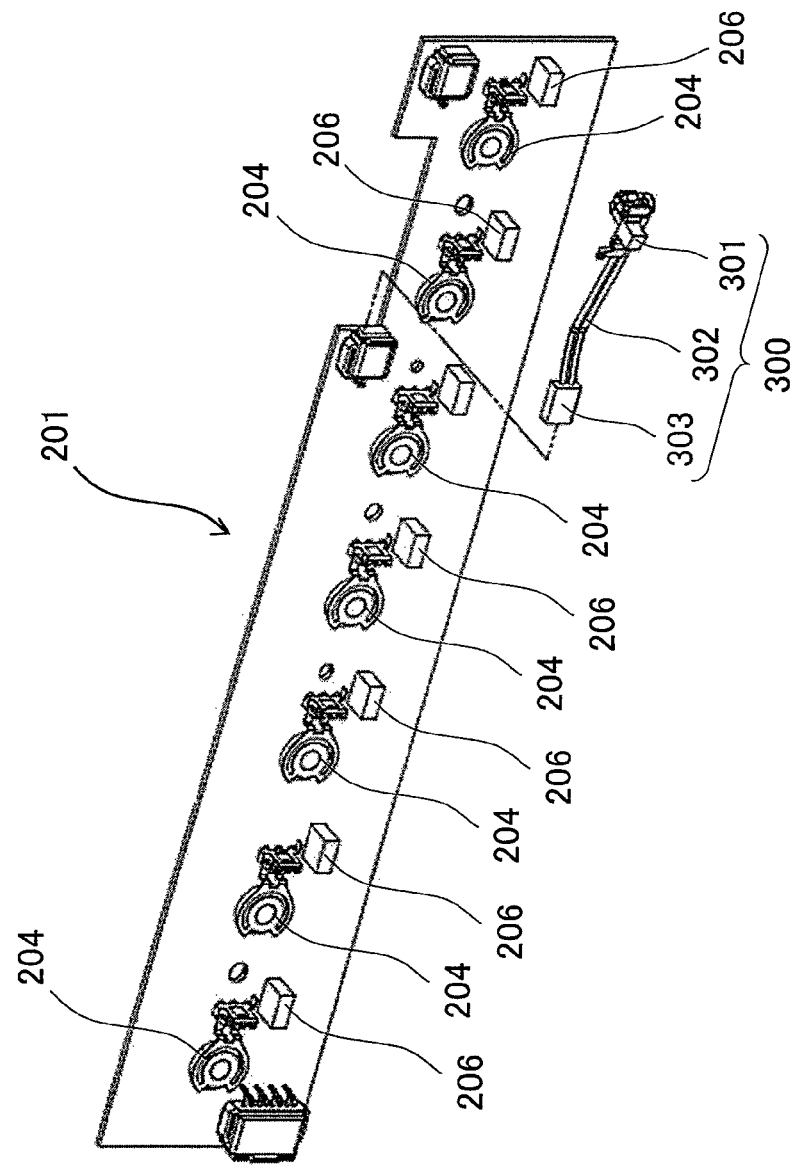
FIG. 17 is a perspective view of a voltage detection board.
Figure 18:
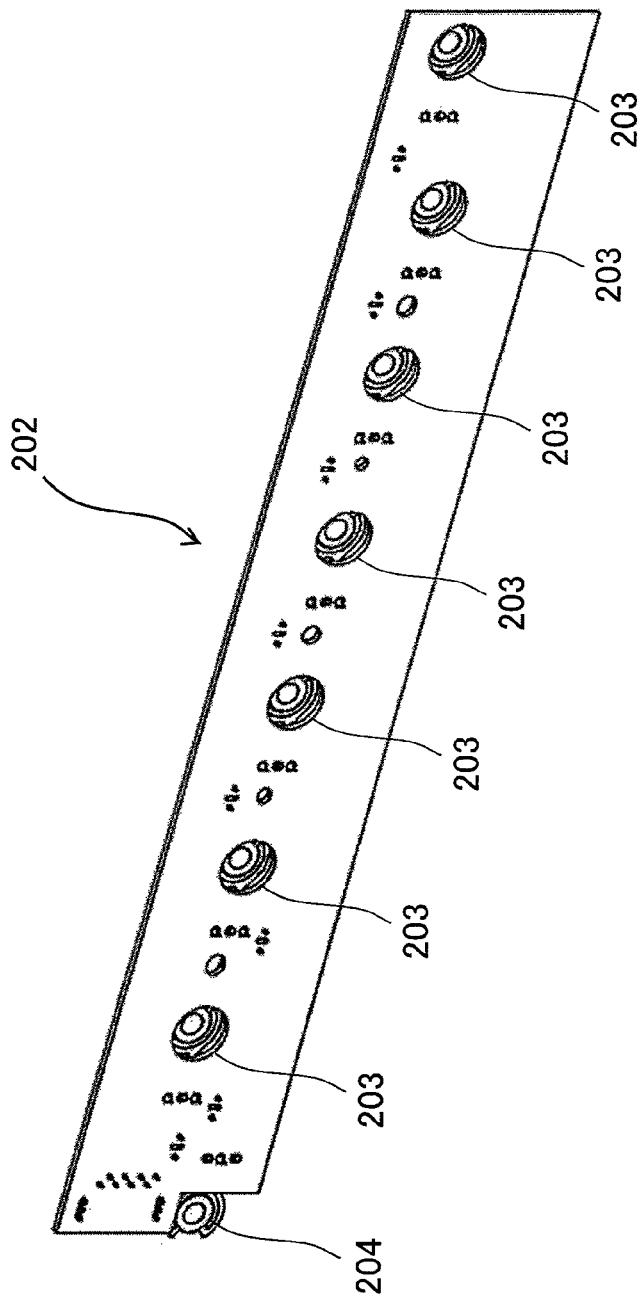
FIG. 18 is a perspective view of another voltage detection board.

FIG. 14 is a perspective external view of the battery block of FIG. 2, FIG. 15 is a perspective external view of the battery block from which the insulating resin cover is removed, FIG. 16 is an exploded perspective view of the battery block of FIG. 14, FIG. 17 is a perspective view of one of the voltage detection boards shown in FIG. 16 and FIG. 18 is a perspective view of the other voltage detection board shown in FIG. 16.

The conductive members 191 electrically series-connect, by welding or the like, the battery cells 101 held in the holding case 111 to be an assembled battery, and are attached to electrodes of the battery cells 101 exposed to the vertical walls 114 on both sides of the holding case 111 (see FIG. 8).

Each conductive member 191 is welded at one end thereof for electric connection to an end of each battery cell 101 at the lower layer via the circular opening made up of the opening window 125 of the lower holding frame 121 and the opening window 135 of the middle holding frame 131, and then is welded at the other end thereof for electric connection to an end of each battery cell 101 at the upper layer located obliquely upward of the battery cell 101 at the lower layer in the longitudinal direction via the circular opening made up of the opening window 137 of the middle holding frame 131 and the opening window 145 of the upper holding frame 141, whereby upper and lower battery cells 101 are connected in series. At a substantially center position of the conductive member 191, a connection terminal 192 is provided for electric connection to voltage detection terminals 204 of the voltage detection boards 201 and 202.

The positive electrode terminal 40A of each battery block 40 is connected to the electrode of the battery cell 101 among the battery cell arrangement 103U at the upper layer that is disposed at a position protruding from the battery cell arrangement 103L at the lower layer in the longitudinal direction. Then, the negative electrode terminal 40B of each battery block 40 is connected to the electrode of the battery cell 101 among the battery cell arrangement 103L at the lower layer that is disposed at a position protruding from the battery cell arrangement 103U at the upper layer in the longitudinal direction. That is, the positive electrode terminal 40A functions as a leading electrode of the positive electrode on one side of the fourteen battery cells connected in series, and the negative electrode terminal 40B functions as a leading electrode of the negative electrode on one side of the fourteen battery cells connected in series.

The temperature detection sensor 300 detects temperature of at least one battery cell 101 among the plurality of battery cells 101 held in the battery blocks 40. In the present embodiment, the temperature detection sensor 300 detects temperature of the battery cell 101 that is disposed at an end on one side of the alignment direction.

The temperature detection sensor 300 is held so as to be pushed against an end face 101a (externally exposure part) of the battery cell 101 that is exposed from the holding case 111. The temperature detection sensor 300 is held at a sensor holder 211 provided at the holding case 111.

The sensor holder 211 is provided at a position facing an end face of the battery cell 101 that is exposed to a side face of the holding case 111. The sensor holder 211 is provided, including a pair of components that are away from each other in the longitudinal direction, on a side face of the lower holding frame 121 on one side. The sensor holder 211 is further provided, including a pair of components that are away from each other in the longitudinal direction, on a side face of the upper holding frame 141 on the other side. The temperature detection sensor 300 is provided selectively at any one of a pair of two components of the sensor holder 211 that are away from each other in the longitudinal direction. For instance, in the example shown in FIG. 16, the temperature detection sensor 300 is held at one of two components of the sensor holder 211 provided at the upper holding frame 141.

The temperature detection sensor 300 includes: a sensor 301 that is pressed against an external exposure part that is formed at an end face of the battery cell 101 and at a lateral position of the conductive member 191 to detect temperature of the battery cell 101; a voltage detection line 302; and a connector 303 that connects the voltage detection line 302 detachably with respect to a socket of the voltage detection board 202.

As shown in FIG. 16, for example, the voltage detection boards 201, 202 are attached along the vertical walls 114, 114 on both sides of the holding case 111, to which the conductive members 191 has been attached, so as to be overlapped laterally on these conductive members 191. In the present embodiment, the voltage detection boards 201, 202 are fixed to the holding case 111 with a plurality of setscrews 193.

The voltage detection boards 201, 202 each include a voltage detection circuit to detect voltage of each battery cell 101 and a fuse 206 to block electric continuity between the voltage detection circuit and the battery cell 101. As shown in FIGS. 17 and 18, for example, the voltage detection boards 201, 202 each have a strip shape extending with a constant width, and include a socket or the like for connection to a voltage detection line.

The voltage detection boards 201, 202 each include openings 203 formed at portions facing substantially center portions of the conductive members 191 when the voltage detection boards 201, 202 are attached to the vertical walls 114 of the holding case 111. Then, at positions facing the openings 203, voltage detection terminals 204 are provided. The voltage detection terminals 204 are connected to a voltage detection circuit, and as shown in FIG. 17, for example, the voltage detection terminals 204 are held by the voltage detection board 201 at their base ends. Connections between connection terminals 192 and the voltage detection terminals 204 are established by screwing of a plurality of terminal screws 194. That is, the voltage detection terminals 204 are electrically connected to the connection terminals 192 of the conductive members 191 via the terminal screws 194. Each voltage detection terminal 204 is formed by bending a conductive thin flat member, and can absorb the displacement to the connection terminal 192 by elastic defamation and further can prevent transmission of vibrations from the voltage detection boards 201, 202 to the conductive member 191.

When the voltage detection boards 201, 202 are attached to the holding case 111, then the voltage detection terminals 204 are placed at positions facing substantially center positions of the conductive members 191.

The fuses 206 are placed on the voltage detection boards 201, 202 and in the vicinity of the corresponding voltage detection terminals 204. When overcurrent flows into the voltage detection boards from a conductive member 191, the fuse 206 melt, for example, to block electric continuity.

The voltage detection boards 201, 202 are provided with other elements, connectors, connection terminals not illustrated, and their descriptions are omitted. In the present embodiment, the two voltage detection boards have different outside shapes, but they may have the same shape and the same wiring pattern so as to be interchangeable for easy assembly process.

The insulating resin cover 310 is formed by shaping an insulating synthesis resin material such as polyvinyl chloride (PVC), and hides end faces of the battery cells 101, the conductive members 191, the voltage detection boards 201, 202 and the temperature detection sensor 300 exposed laterally of the holding case 111 thereunder.

The insulating resin cover 310 has a cross section of a substantially U-shape, including a counter face 311 facing the vertical wall 114 of the holding case 111 and a pair of bending pieces 312 that are bent at the upper side and the lower side of the counter face and protrude toward the vertical wall 114. The counter face 311 is provided with a plurality of protrusions 311*a* protruding in the same direction as of the bending pieces 312. The protrusions 311*a* are provided at positions corresponding to the openings 203 of the voltage detection boards 201, 202, and as the insulating resin cover 310 is attached, the protrusions 311*a* are inserted into the openings 203 to face heads of the terminal screws 194, thus preventing falling-off of the terminal screws 194.

The bending piece 312 are each provided with a flange directed to mutually opposite directions, and these flanges are engaged with hooks provided at the vertical wall 114 of the lower case 11, whereby the insulating resin cover 310 is attached to the holding case 111.

The insulating resin cover 310 can prevent an operator touching an electrode of a battery cell 101 or a conductive member 191 during attaching/detaching operations of the battery blocks 40 to the module case 2, for example, from getting an electric shock. The insulating resin cover 310 further can prevent, when an impact is externally given to the module case 2, the electrodes of the battery cells 101 and the conductive members 191 from coming into contact with a conductive member such as the lower case 11 and shorting out.

Figure 13A:
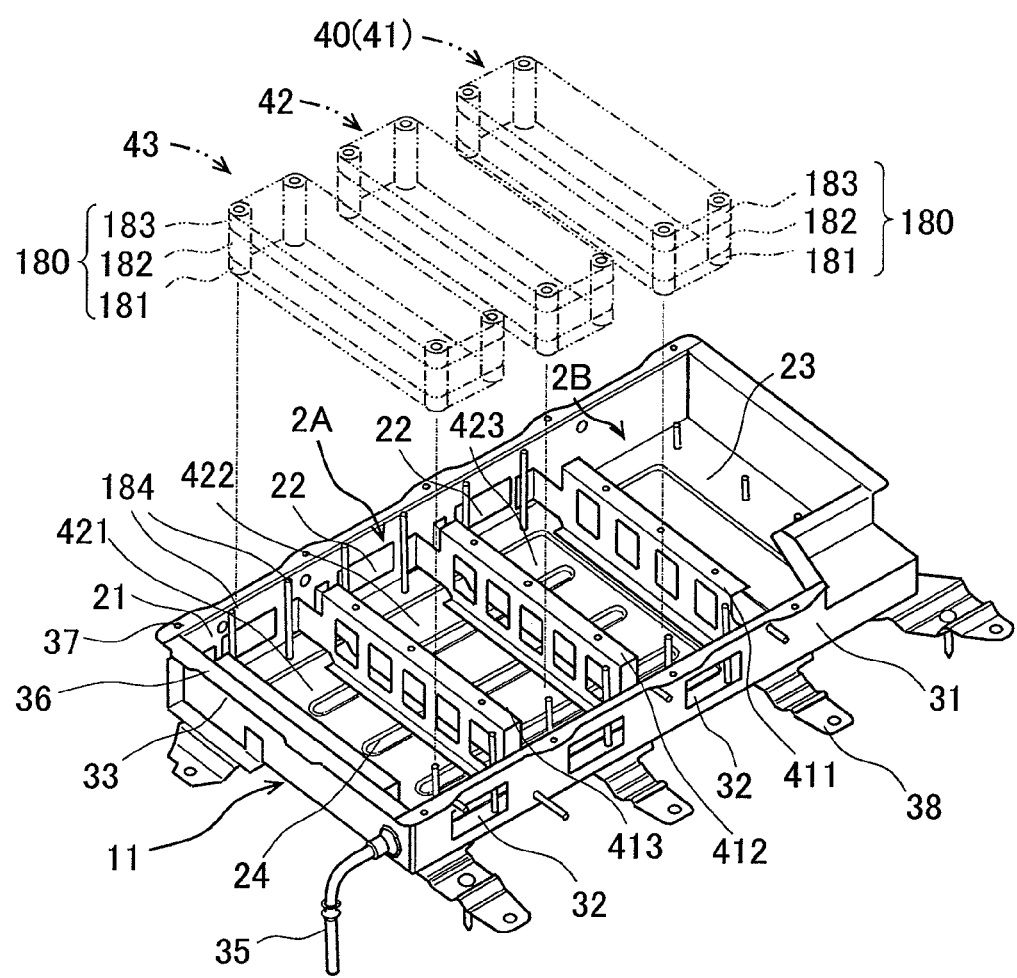
FIG. 13A schematically shows the state of accommodating the battery blocks of FIGS. 4 and 5 in a lower case.
Figure 13B:
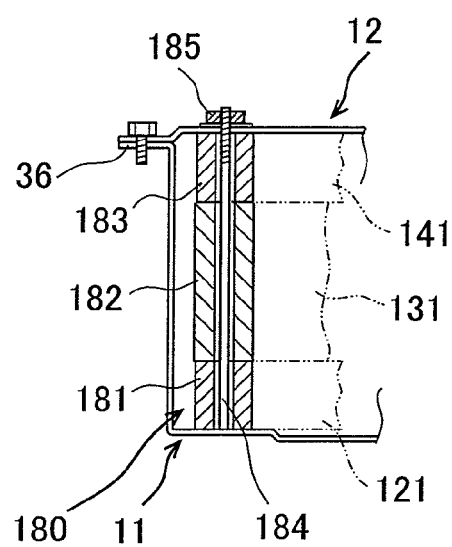
FIG. 13B schematically shows the state of major parts after the battery blocks of FIGS. 4 and 5 have been accommodated in a lower case.

The thus configured battery block 40 holding a plurality of battery cells 101 in the assembled state has the appearance as the long hexahedral shaped holding case 111, and so has a substantially rectangular parallelepiped shape. Then, at four corners of the battery block 40, fixing means 180 is provided to fix the battery block in the lower case 11 of the module case 2. Referring to FIGS. 4, 13A and 13B, for example, the fixing means is described below in detail.

In FIGS. 4, 13A and 13B, the fixing means 180 includes a cylindrical fixing boss having a through hole penetrating vertically, a stud fixed vertically from a case bottom wall 23 of the lower case 11 of the module case 2 and a fixing nut. Specifically, the fixing means includes fixing bosses 181 formed at four corners of the lower holding frame 121, each having a through hole penetrating vertically, fixing bosses 182 formed at four corners of the middle holding frame 131, each having a through hole penetrating vertically, fixing bosses 183 formed at four corners of the upper holding frame 141, each having a through hole penetrating vertically, studs 184 penetrating through the through holes of the three fixing bosses 181, 182 and 183 and standing from the lower case 11 and lock nuts 185 screwed in at upper ends of the studs. The studs are fixed at the bottom face of the lower case by welding or the like. The fixing bosses provided at three of the upper, middle and lower holding frames are configured so that their counter faces are brought into contact. Four studs 184 are provided for each battery block, meaning twelve studs in total provided in a standing manner.

The studs 184 standing upwardly from the lower case 11 of the module case 2 are allowed to pass through the through holes of the fixing bosses 181, 182 and 183 formed at four corners of the battery block 40 one by one, and then the lock nuts 185 are fastened at the upper ends, whereby the battery block 40 can be securely fixed in the module case 2. All of the first battery block 41, the second battery block 42 and the third battery block 43 similarly undergo the same procedure including allowing the studs 184 to pass through the through holes of the fixing bosses, followed by fastening of the nuts, whereby the three battery blocks can be easily and securely fixed in the battery unit accommodation area 2A of the lower case 11. The upper end of each stud 184 protrudes upward from the upper cover 12, to which then the nut is screwed, whereby the upper cover 12 can be fixed integrally with the battery block 40.

<Module Case>

FIG. 13A is a perspective view of the lower case 11 of the module case 2. As described above, the module case 2 includes the lower case 11 opening upward and the upper cover 12 closing the upper opening of the lower case 11 (see FIG. 2). The lower case 11 is formed by box-bending processing, and includes a bottom wall 23 having a substantially rectangular shape in plan view, a front wall 21 and a rear wall 31 facing each other in the front-rear direction and a pair of side walls 33 facing each other in the left-right direction, the walls 21, 31 and 33 being bent at the four sides of the bottom wall 23 so as to stand vertically. Then, portions between the front wall 21, the rear wall 31 and the side walls 33 are jointed hermetically by welding. The lower case 11 is configured to let the outer periphery of the bottom wall 23 stand so as to form an accommodation space therein, upper parts of the standing parts being extended horizontally to form a flange 36. The flange 36 is formed with screw holes 37 to fix the upper cover 12.

Meanwhile, as shown in FIGS. 1 and 2, the upper cover 12 is made of a metal plate having a substantially rectangular shape similar to the lower case 11, and includes a different-level part 401 at an outer periphery so as to face the flange 36 of the lower case 11. The different-level part 401 is formed with through holes 402 at positions corresponding to the screw holes 37 of the lower case 11. A center flat part of the upper cover 12 is formed with three different-level parts 403 in the direction orthogonal to the longitudinal direction, in which through holes 404 for setscrews are formed.

In the lower case 11, four ribs 411 to 414 are provided, extending in the front-rear direction and having predetermined intervals therebetween in the lateral direction. Each rib 411 to 414 is provided in a standing manner at the bottom wall 23 spread like a plane between the front wall 21 and the rear wall 31 of the lower case 11. Among these four ribs 411 to 414, the first rib 411 divides the lower case 11 into one side in the lateral direction and the other side in the lateral direction, thus defining the battery unit accommodation area 2A to accommodate the battery unit 3 and the control unit accommodation area 2B to accommodate the control unit 4 (middle wall rib).

Since the lower case 11 includes the front wall 21, the rear wall 31 and the side walls 33 standing vertically from the bottom wall 23 formed by box-bending, wasted space can be reduced compared with an example of forming walls obliquely by deep-drawing processing of a metal plate, whereby a limited space in a vehicle can be effectively used, and so a larger internal space can be secured for the same installation space. Herein, the four ribs 411 to 414 provided in the lower case 11 are each provided with a plurality of holes, that is, with lightening holes for light-weight. The lower case 11 is provided, at the lower part, with a plurality of brackets 38 to fix the lower case to the floor of the vehicle.

The second rib 412 and the third rib 413 divide the battery unit accommodation area 2A into three battery block accommodation rooms, where a first accommodation room 421 is formed between the first rib 411 and the second rib 412 to accommodate the first battery block 41, a second accommodation room 422 is formed between the second rib 412 and the third rib 413 to accommodate the second battery block 42, and a third accommodation room 423 is formed between the third rib 413 and the fourth rib 414 to accommodate the third battery block 43. The fourth rib 414 is provided along the side wall 33.

Each rib 411 to 414 is provided with screw holes at their upper parts, and the three ribs 411 to 413 are disposed so as to coincide with the position of the different-level part 403 of the upper cover 12, and the through holes 402 at the different-level part coincide with the through holes of the three ribs 411 to 413. In this way, the upper cover 12 closes the upper opening of the lower case 11 so that the different-level part 401 at the outer periphery of the upper cover 12 faces and comes into contact with the flange 36 of the lower case 11, followed by screwing, and the three ribs face and come into contact with the different-level part 401 of the upper cover, followed by fastening at the upper parts of the ribs 411 to 413 using screws.

As shown in FIG. 13A, the bottom wall 23 of the lower case 11 is provided with a plurality of shallow grooves 24. The shallow grooves 24 are formed by making corresponding parts of the lower case 11 protrude downward from the bottom wall 23 during press forming, for example. The shallow grooves 24 are extended in the front-rear direction and in the lateral direction so as to intersect mutually. The shallow grooves 24 extending in the lateral direction continue across the first accommodation room 421 to the third accommodation room 423. With this configuration, the lower case 11 can have high stiffness, thus preventing deformation of the module case 2.

The side walls 33 of the lower case 11 are formed with a gas exhaust slot as an opening, to which a gas exhaust pipe 35 is connected. Then, the inlets 22 at the front wall 21 and the outlets 32 at the rear wall 31 are formed so as to make a pair at corresponding positions in the accommodation rooms 421 to 423. Each battery block 41 to 43 is accommodated while the movement in the lateral direction being limited by the ribs 411 to 414.

The shallow grooves 24 formed at the bottom wall 23 of the lower case 11 let gas discharged from at least one of the battery cells 101 in the battery blocks 41 to 43 accommodated in the accommodation rooms 421 to 423 pass therethrough, so as to allow the gas to pass through the gas exhaust pipe 35 connected to the gas exhaust slot for discharging to the outside of the module case 2.

According to the aforementioned configuration, the shallow grooves 24 of the lower case 11 formed continuously across the first accommodation room 421 to the third accommodation room 423 make the three accommodation rooms communicate with each other, and thus when at least one of the battery cells 101 in the battery blocks 41 to 43 accommodated in the accommodation rooms 421 to 423 emits gas, the gas is allowed to pass through the shallow grooves 24 to the side walls 33, to which the gas exhaust pipe 35 is connected, and then the gas can be discharged through the gas exhaust pipe 35 to the outside of the module case 2. As such, this configuration can prevent the gas emitted in the module case 2 from staying in the module case 2 and intruding the holding case 111 of the battery block 40 through a space between the front wall 21 and the end face 115 on the front side of the case, or prevent the gas from passing through a space between the rear wall 31 and the rear end face 114 of the case and being discharged through the outlet 32 of the rear wall 31.

The bottom wall 23 of the lower case 11 provided with the shallow grooves 24 extending in the front-rear direction and in the lateral direction and provided with the first ribs 411 to the fourth ribs 414 extending in the front-rear direction can lead to high stiffness of the lower case 11, thus preventing deformation of the module case 2.

The thus configured three battery blocks 41 to 43 are accommodated in the battery unit accommodation area 2A of the module case 2 and are fixed in the module case 2 by the fixing means 180. Specifically, they are accommodated by allowing the studs 184 standing from the bottom wall 23 of the lower case 11 to pass through the through holes of the fixing bosses 181, 182 and 183 formed at four corners of the lower holding frame 121, the middle holding frame 131 and the upper holding frame 141 making up the battery block 40, thus aligning the three battery blocks in the lower case 11.

The three battery blocks 41 to 43 accommodated and fixed in the lower case 11 have, as the external leading terminals, their three positive electrode terminals 40A (41A, 42A, 43A) and three negative electrode terminals (41B, 42B), 40C (43C) located differently in the front and the rear directions. As such, a harness or a bass bar connecting the three positive electrode terminals 40A is disposed in the harness guide 54A disposed in the module case 2, and a harness or a bass bar connecting the three negative electrode terminals 40B, 40C is disposed in the harness guide 54B disposed in the module case 2.

The front-side harness guide 54A in the front-rear direction is configured to connect the positive electrode terminals 40A of the three battery blocks, for example, and deliver the wiring to the control unit accommodation area 2B, and the rear-side harness guide 54B is configured to connect the negative electrode terminals 40B, 40C of the three battery blocks, for example, and deliver the wiring to the control unit accommodation area 2B. Then, a power supply line of the battery unit 3 is connected to a predetermined terminal of the control unit 4 in the control unit accommodation area 2B. In the present embodiment, during fastening the lock nuts 185, the upper cover 12 is overlaid so that the different-level parts 403 of the upper cover 12 are overlapped with the ribs 411 to 413, followed by screwing the lock nuts similarly, whereby the module case 2 and the plurality of battery blocks can be jointed firmly.

Although that is a detailed description of the embodiments of the present invention, the present invention is not limited to the above-stated embodiments, and it should be understood that we intend to cover by the present invention design modifications without departing from the spirits of the present invention. For instance, in the aforementioned embodiments, each battery block 40 includes the battery cell arrangement 103U at the upper layer and the battery cell arrangement 103L at the lower layer, and the battery block may include three or more layers.

Alternatively, the battery block may include a single layer of the battery cell arrangement, sandwiched between upper and lower holding frames. A secondary battery module according to the present invention is not limited to the applications for vehicles such as automobiles but is applicable to railway vehicles.

What is claimed is:

1. A battery block, comprising:
a cylindrical plurality of battery cells arranged; and
two holding members sandwiching the arrangement of the battery cells from a radial direction of the battery cells for holding, the two holding members facing each other, wherein
first holding recesses are formed by first semicircular members on one of the two holding members, each first semicircular member holding an outer periphery of each end of each battery cell in a respective first holding recess,
two protrusions extending radially inwardly from the first semicircular member and in contact with an outer peripheral face of each end of each battery cell are formed at each first holding recess,
second holding recesses are formed by second semicircular members on the other holding member, each second semicircular member holding an outer periphery of each end of each battery cell in a respective second holding recess and being arranged opposite to the corresponding first holding recess,
an elastically deformable pressing part that presses the outer peripheral face of the battery cell inwardly in the radial direction is integrally formed along each second holding recess, and
the two protrusions are in contact with an outer peripheral face of each end of each battery cell and the elastically deformable pressing part presses the outer peripheral face, thereby allowing the two holding members to hold the plurality of battery cells,
wherein the elastically deformable part includes a pair of connecting legs connected to a base portion of the other holding member and an elastically deformable leg connected at its ends to the pair of connecting legs and being spaced from the base portion of the other holding member.

2. The battery block according to claim 1, further comprising: an adhesive layer between the two holding members and the battery cell being held at the outer peripheral face by the two holding members.

3. The battery block according to claim 2, wherein the two holding members include a plurality of fastening means provided at intermediate positions between neighboring battery cells among the plurality of battery cells to fix the two holding members.

4. The battery block according to claim 3, wherein the two holding members comprise, as alignment means, a protrusion for alignment disposed at one of the two holding members and a recess for alignment disposed at the other, the protrusion fitting into the recess.

5. The battery block according to claim 1, wherein
the arrangement of the battery cells comprises a battery-cell arrangement at a lower layer and a battery-cell arrangement at an upper layer,
the battery-cell arrangement at the lower layer includes battery cells sandwiched by a lower-layer holding member and a middle holding member from a radial direction of the battery cells for holding,
the battery-cell arrangement at the upper layer includes battery cells sandwiched by an upper-layer holding member and the middle holding member from a radial direction of the battery cells for holding,
one of the lower-layer holding member and the middle holding member includes two protrusions in contact with an outer peripheral face of each end of each battery cell and an elastically deformable pressing part that presses the outer peripheral face of the battery cell inwardly in the radial direction, and one of the upper-layer holding member and the middle holding member includes two protrusions in contact with an outer peripheral face of each end of each battery cell and an elastically deformable pressing part that presses the outer peripheral face of the battery cell inwardly in the radial direction.

6. The battery block according to claim 5, wherein the lower-layer holding member and the middle holding member include a plurality of lower fastening means provided at intermediate positions of the neighboring battery cells to fix the lower-layer holding member and the middle holding member, and the middle holding member and the upper-layer holding member include a plurality of upper fastening means provided at intermediate positions of the neighboring battery cells to fix the middle holding member and the upper-layer holding member.

7. The battery block according to claim 6, wherein the battery-cell arrangement at the lower layer and the battery-cell arrangement at the upper layer are mutually displaced, and the lower fastening means and the upper fastening means are provided at a half pitch of a pitch of the plurality of battery cells arranged.

8. The battery block according to claim 5, wherein the lower-layer holding member and the middle holding member comprise, as alignment means, a protrusion for alignment disposed at one of the holding members and a recess for alignment disposed at the other, the protrusion fitting into the recess, and the upper-layer holding member and the middle holding member comprise, as alignment means, a protrusion for alignment disposed at one of the holding members and a recess for alignment disposed at the other, the protrusion fitting into the recess.

9. The battery block according to claim 5, wherein the battery-cell arrangement at the lower layer includes an adhesive layer between the lower-layer holding member and the middle holding member, the battery cells being held by the lower-layer holding member and the middle holding member, and the battery-cell arrangement at the upper layer includes an adhesive layer between the upper-layer holding member and the middle holding member, the battery cells being held by the upper-layer holding member and the middle holding member.

10. The battery block according to claim 5, wherein each battery cell includes a positive electrode and a negative electrode at two opposed faces sandwiching the outer peripheral face, the arrangement of the plurality of battery cells include a conductive member connecting a positive electrode and a negative electrode of neighboring battery cells in series, and the battery cell located at an end includes an external leading terminal.

11. The battery block according to claim 10, further comprising a dummy cell having a same shape as the battery cells at an end position, wherein the external leading terminal is shaped so as to bypass the dummy cell and electrically connect the battery cell located at the end with a connection terminal.

12. The battery block according to claim 1, further comprising a voltage detection board including: a voltage detection circuit that detects voltage of the battery cells; and a fuse that blocks electrical continuity between the voltage detection circuit and the battery cells.

13. A secondary battery module, comprising a plurality of the battery blocks each according to claim 1, the plurality of battery blocks being arranged in parallel and accommodated in a case, wherein the case includes a lower case having an upper opening and an upper cover that closes the upper opening, the lower case includes fastening means upwardly provided in a standing manner from a bottom face of the lower case, and the battery blocks are fixed in the case by the fastening means.

14. The secondary battery module according to claim 13, wherein the fastening means includes a stud and a nut, each battery block includes a through hole through which the stud penetrates, and the nut is screwed in at an upper end of the stud so as to fix the battery blocks.

15. The secondary battery module according to claim 14, wherein the stud protrudes upwardly from the upper cover, and screwing of the nut at the upper end of the stud fixes the upper cover integrally with the battery blocks.

* * * * *